United States Patent
Lei et al.

(10) Patent No.: US 12,425,839 B2
(45) Date of Patent: Sep. 23, 2025

(54) CAPABILITY CONFIGURATIONS FOR NEW RADIO REDCAP DEVICES

(71) Applicant: QUALCOMM Incorporated, San Diego, CA (US)

(72) Inventors: Jing Lei, San Diego, CA (US); Huilin Xu, Temecula, CA (US); Peter Pui Lok Ang, San Diego, CA (US); Chao Wei, Beijing (CN); Linhai He, San Diego, CA (US); Wanshi Chen, San Diego, CA (US); Peter Gaal, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 17/758,684

(22) PCT Filed: Feb. 4, 2021

(86) PCT No.: PCT/CN2021/075245
§ 371 (c)(1),
(2) Date: Jul. 12, 2022

(87) PCT Pub. No.: WO2021/155822
PCT Pub. Date: Aug. 12, 2021

(65) Prior Publication Data
US 2023/0036057 A1 Feb. 2, 2023

(30) Foreign Application Priority Data
Feb. 4, 2020 (WO) ................ PCT/CN2020/074271

(51) Int. Cl.
*H04W 72/12* (2023.01)
*H04L 1/00* (2006.01)
(Continued)

(52) U.S. Cl.
CPC ............. *H04W 8/22* (2013.01); *H04L 1/0003* (2013.01); *H04L 27/26025* (2021.01); *H04W 72/1263* (2013.01)

(58) Field of Classification Search
CPC ... H04W 8/22; H04W 72/04; H04W 72/1263; H04W 74/0833; H04W 24/08;
(Continued)

(56) References Cited

U.S. PATENT DOCUMENTS 10,666,334 B2 * 5/2020 Xiong .................. H04B 7/0695
2017/0208455 A1 7/2017 Au et al.
(Continued)

FOREIGN PATENT DOCUMENTS

| CN | 110100405 A | 8/2019 |
|----|-------------|--------|
| CN | 110115008 A | 8/2019 |
| CN | 110168972 A | 8/2019 |

OTHER PUBLICATIONS

Huawei, Hisilicon: "On Mixed Numerology for CA", 3GPP TSG-RAN WG4 Meeting #86, R4-1801968, Athens, Greece, Feb. 26-Mar. 2, 2018, 2 Pages.
(Continued)

*Primary Examiner* — Wei Zhao
(74) *Attorney, Agent, or Firm* — Harrity & Harrity, LLP

(57) ABSTRACT

Various aspects of the present disclosure generally relate to configurations for new radio (NR) devices with reduced capabilities. In some aspects, a user equipment (UE) may determine a configuration from stored configuration information, where the configuration specifies a subset of features that NR UE with reduced capabilities is to support. The UE may communicate according to the configuration of reduced capabilities, or fall back to a set of further reduced UE capabilities. Numerous other aspects are provided.

30 Claims, 15 Drawing Sheets

(51) Int. Cl.
*H04L 27/26* (2006.01)
*H04W 8/22* (2009.01)
*H04W 72/1263* (2023.01)

(58) Field of Classification Search
CPC .............. H04W 72/126; H04W 74/083; H04L 27/26025; H04L 1/0003; H04L 27/2602; H04L 1/00
See application file for complete search history.

(56) References Cited

U.S. PATENT DOCUMENTS

| | | | |
|---|---|---|---|
| 2018/0279310 A1 | 9/2018 | Chen et al. | |
| 2018/0331875 A1 | 11/2018 | Abedini et al. | |
| 2019/0124572 A1* | 4/2019 | Park | H04W 40/24 |
| 2019/0253925 A1 | 8/2019 | Gholmieh et al. | |
| 2019/0349155 A1 | 11/2019 | Xu et al. | |
| 2019/0363843 A1 | 11/2019 | Gordaychik | |
| 2020/0204325 A1* | 6/2020 | Liu | H04L 5/001 |
| 2021/0051585 A1* | 2/2021 | Kim | H04W 76/28 |
| 2021/0058971 A1* | 2/2021 | MolavianJazi | H04B 17/318 |
| 2021/0168779 A1* | 6/2021 | Mondal | H04L 5/0035 |

OTHER PUBLICATIONS

Intel Corporation: "Views on NR SCS Capabilities for CA", 3GPP TSG-RAN WG4 Meeting #86, R4-1802919, Athens, Greece, Feb. 26-Mar. 2, 2018, pp. 1-3.
International Search Report and Written Opinion—PCT/CN2021/075245—ISA/EPO—Apr. 27, 2021.
International Search Report and Written Opinion—PCT/CN2020/074271—ISA/EPO—Oct. 26, 2020.
Ericsson: "New SID on Support of Reduced Capability NR Devices", 3GPP TSG RAN Meeting #86, 3GPP Draft, RP-193238, 3rd Generation Partnership Project, Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 12, 2019, 5 Pages, XP051840369, Section 4, p. 3.
Supplementary European Search Report—EP21750489—Search Authority—Berlin—Feb. 9, 2024.

* cited by examiner

| Use cases | DL Peak Rate (Mbps) | UL Peak Rate (Mbps) | Min UE BW Req. (MHz) | Number of TX Ant. | Number of RX Ant. | Support for 256 QAM | Mobility | Power Saving Req. |
|---|---|---|---|---|---|---|---|---|
| Wearables | 150 | 50 | 40 (20) | 1 | 1 (2) | No | medium | high |
| Industry Sensors | < 2 | < 5 | 10 (5) | 1 | 1 | No | low | high |
| Video Surveillance | < 5 | 25 | 20 (10) | 1 (2) | 1 | No | low | low/medium |

Configurations

FIG. 6

CAPABILITY CONFIGURATIONS FOR NEW RADIO REDCAP DEVICES

CROSS-REFERENCE TO RELATED APPLICATIONS

This Application is a 371 National Stage of PCT Application No. PCT/CN2021/075245 filed on Feb. 4, 2021, entitled "CAPABILITY CONFIGURATIONS FOR NEW RADIO REDCAP DEVICES," which claims priority to PCT Patent Application No. PCT/CN2020/074271, filed on Feb. 4, 2020, entitled "CAPABILITY CONFIGURATIONS FOR NEW RADIO REDCAP DEVICES," both of which are hereby expressly incorporated by reference herein.

FIELD OF THE DISCLOSURE

Aspects of the present disclosure generally relate to wireless communication and to techniques and apparatuses for configuring capabilities of new radio reduced capability devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include determining a configuration from stored configuration information, where the configuration specifies a subset of features that a new radio (NR) UE with reduced capabilities is to support, and communicating according to the configuration.

In some aspects, a method of wireless communication, performed by a base station, may include determining a configuration for a UE from stored configuration information, where the configuration specifies a subset of features that an NR UE with reduced capabilities is to support, and communicating with the UE according to the configuration.

In some aspects, a one or more processors for wireless communication may include memory and one or more processors coupled to the memory. The memory may include instructions that, when executed by the one or more processors, cause the UE to determine a configuration from stored configuration information, where the configuration specifies a subset of features that an NR UE with reduced capabilities is to support, and communicate according to the configuration.

In some aspects, a one or more processors for wireless communication may include memory and one or more processors coupled to the memory. The memory may include instructions that, when executed by the one or more processors, cause the base station to determine a configuration for a UE from stored configuration information, where the configuration specifies a subset of features that an NR UE with reduced capabilities is to support, and communicate with the UE according to the configuration.

In some aspects, a non-transitory computer-readable medium may store one or more instructions for wireless communication. The one or more instructions, when executed by one or more processors of a UE, may cause the UE to determine a configuration from stored configuration information, where the configuration specifies a subset of features that an NR UE with reduced capabilities is to support, and communicate according to the configuration.

In some aspects, a non-transitory computer-readable medium may store one or more instructions for wireless communication. The one or more instructions, when executed by one or more processors of a base station, may cause the base station to determine a configuration for a UE from stored configuration information, where the configuration specifies a subset of features that an NR UE with reduced capabilities is to support, and communicate with the UE according to the configuration.

In some aspects, an apparatus for wireless communication may include means for determining a configuration from stored configuration information, where the configuration specifies a subset of features that an NR UE with reduced capabilities is to support, and means for communicating according to the configuration.

In some aspects, an apparatus for wireless communication may include means for determining a configuration for a UE from stored configuration information, where the configuration specifies a subset of features that an NR UE with reduced capabilities is to support, and means for communicating with the UE according to the configuration.

In some aspects, an apparatus for wireless communication may include at least one processor and memory coupled to the at least one processor, the memory storing instructions executable by the at least one processor to cause the apparatus to: determine a configuration from stored configuration information, where the configuration specifies a subset of features that an NR UE with reduced capabilities is to support, and communicate according to the configuration.

In some aspects, an apparatus for wireless communication may include at least one processor and memory coupled to the at least one processor, the memory storing instructions executable by the at least one processor to cause the apparatus to: determine a configuration for a UE from stored configuration information, where the configuration specifies a subset of features that an NR UE with reduced capabilities is to support, and communicate with the UE according to the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 illustrates an example of bandwidth and antenna configurations for an NR RedCap UE, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
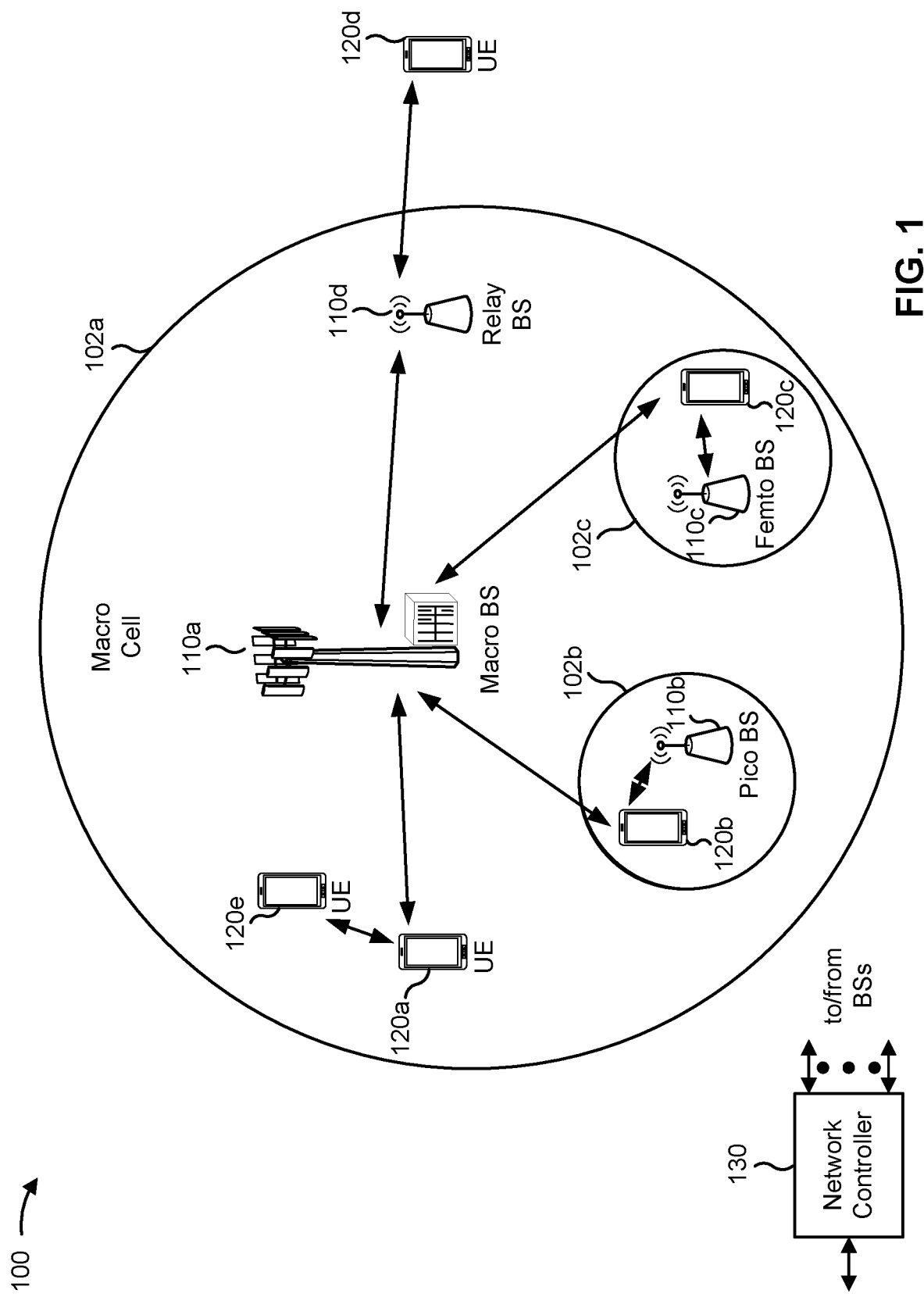
FIG. 1 is a diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "ITRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, and/or a station. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
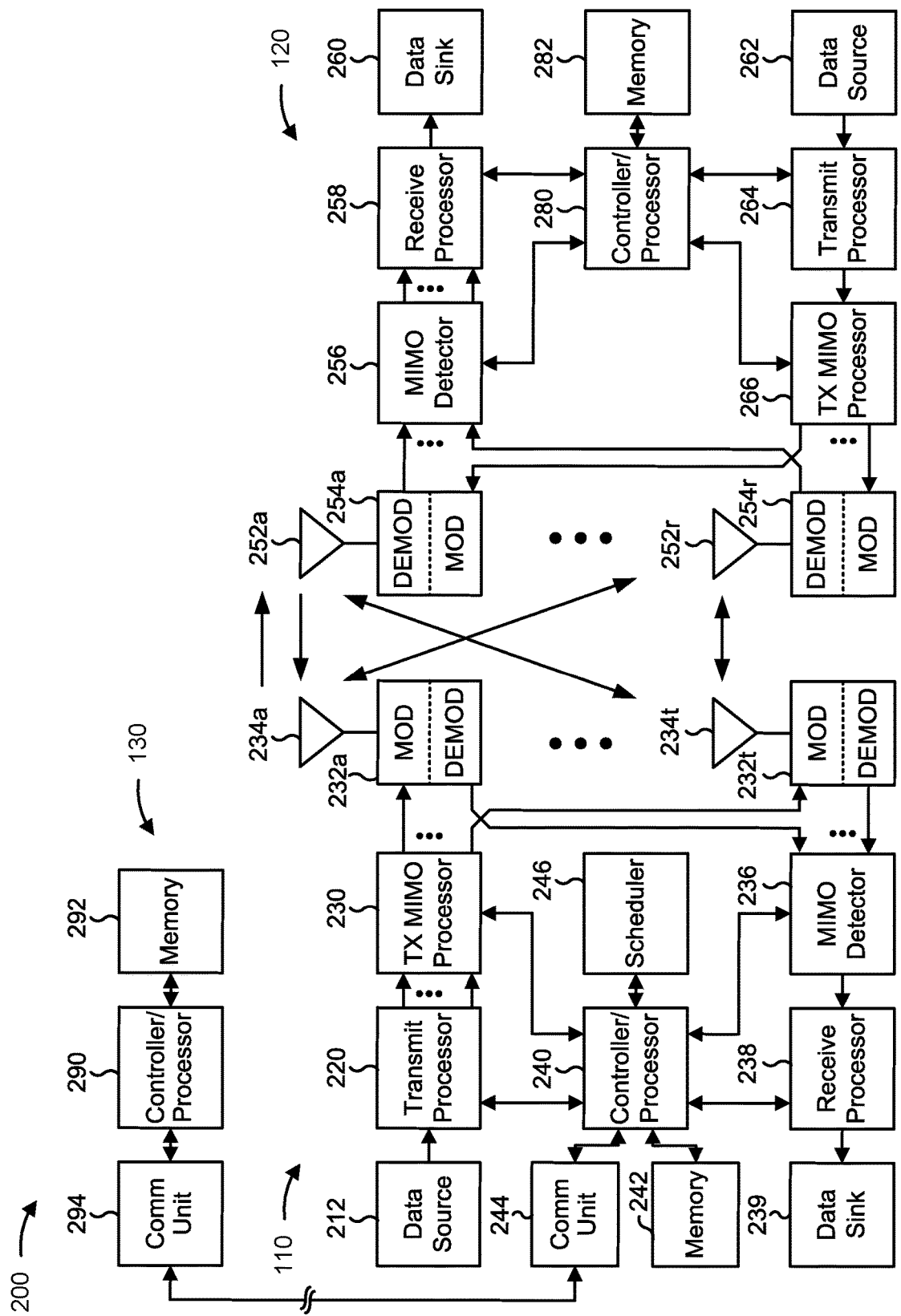
FIG. 2 is a diagram illustrating an example of a base station in communication with a UE in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-14.

Controller/processor 240 of base station 110, controller/processor 280 of UE 120, and/or any other component(s) of FIG. 2 may perform one or more techniques associated with configurations for NR reduced capability (RedCap) devices, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions (e.g., code and/or program code), when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and process 1400 of FIG. 14, and/or other processes as described herein. In some aspects, executing instructions may include running the instructions, converting the instructions, compiling the instructions, and/or interpreting the instructions. A scheduler 246 may schedule UEs for data transmission on the downlink and/or uplink.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 may include means for determining a configuration from stored configuration information, where the configuration specifies a subset of features that an NR UE with reduced capabilities is to support, means for communicating according to the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining a configuration for a UE from stored configuration information, where the configuration specifies a subset of features that an NR UE with reduced capabilities is to support, means for communicating with the UE according to the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

As indicated above, FIG. 2 is provided as an example. Other examples may differ from what is described with regard to FIG. 2.

Figure 3A:
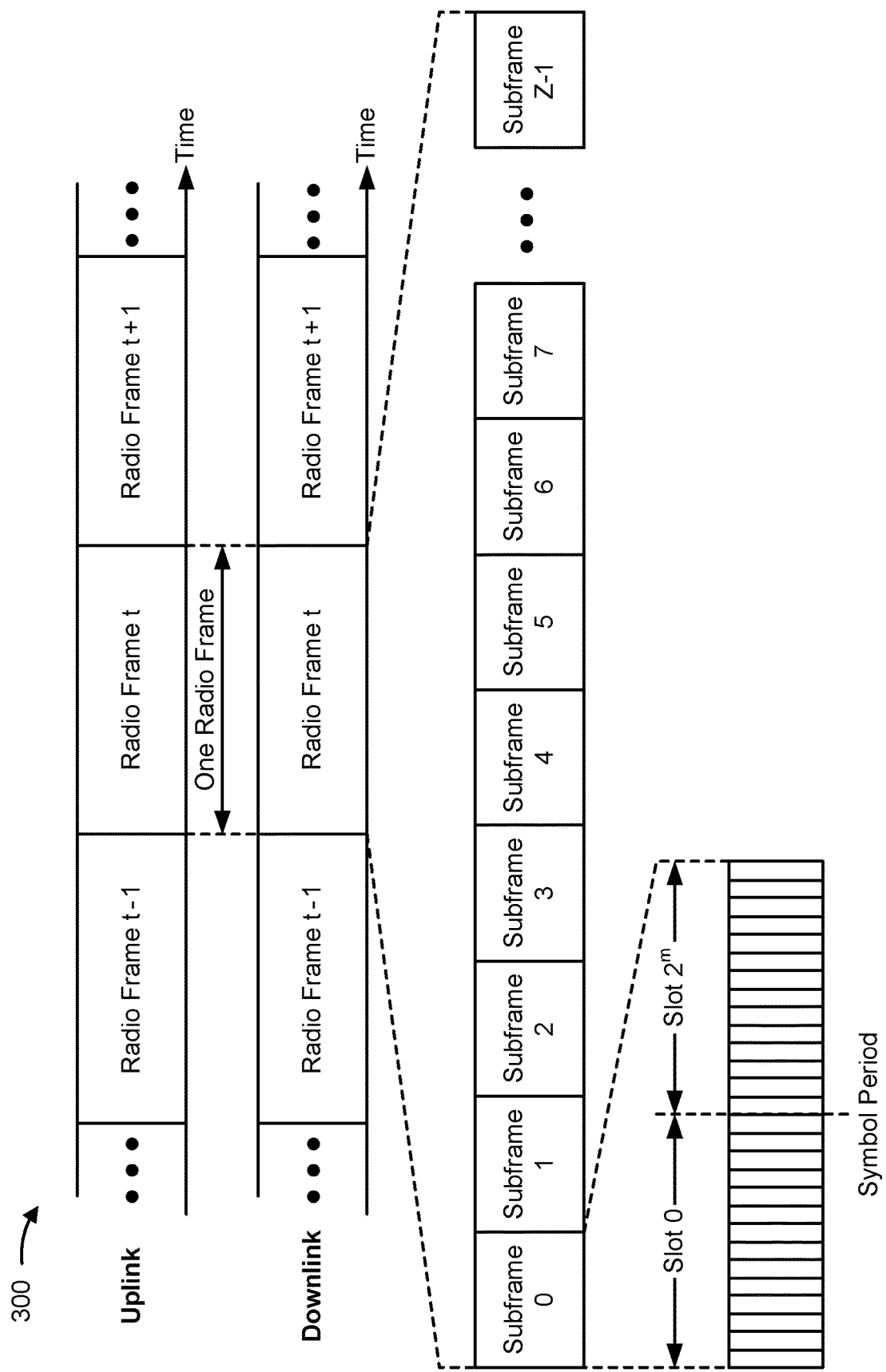
FIG. 3A is a diagram illustrating an example of a frame structure in a wireless communication network, in accordance with the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z-1). Each subframe may have a predetermined duration (e.g., 1 ms) and may include a set of slots (e.g., 2 m slots per subframe are shown in FIG. 3A, where m is a numerology used for a transmission, such as 0, 1, 2, 3, 4). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L-1. In some aspects, a scheduling unit for the FDD may be frame-based, subframe-based, slot-based, and/or symbol-based.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS) and/or a secondary synchronization signal (SSS) on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
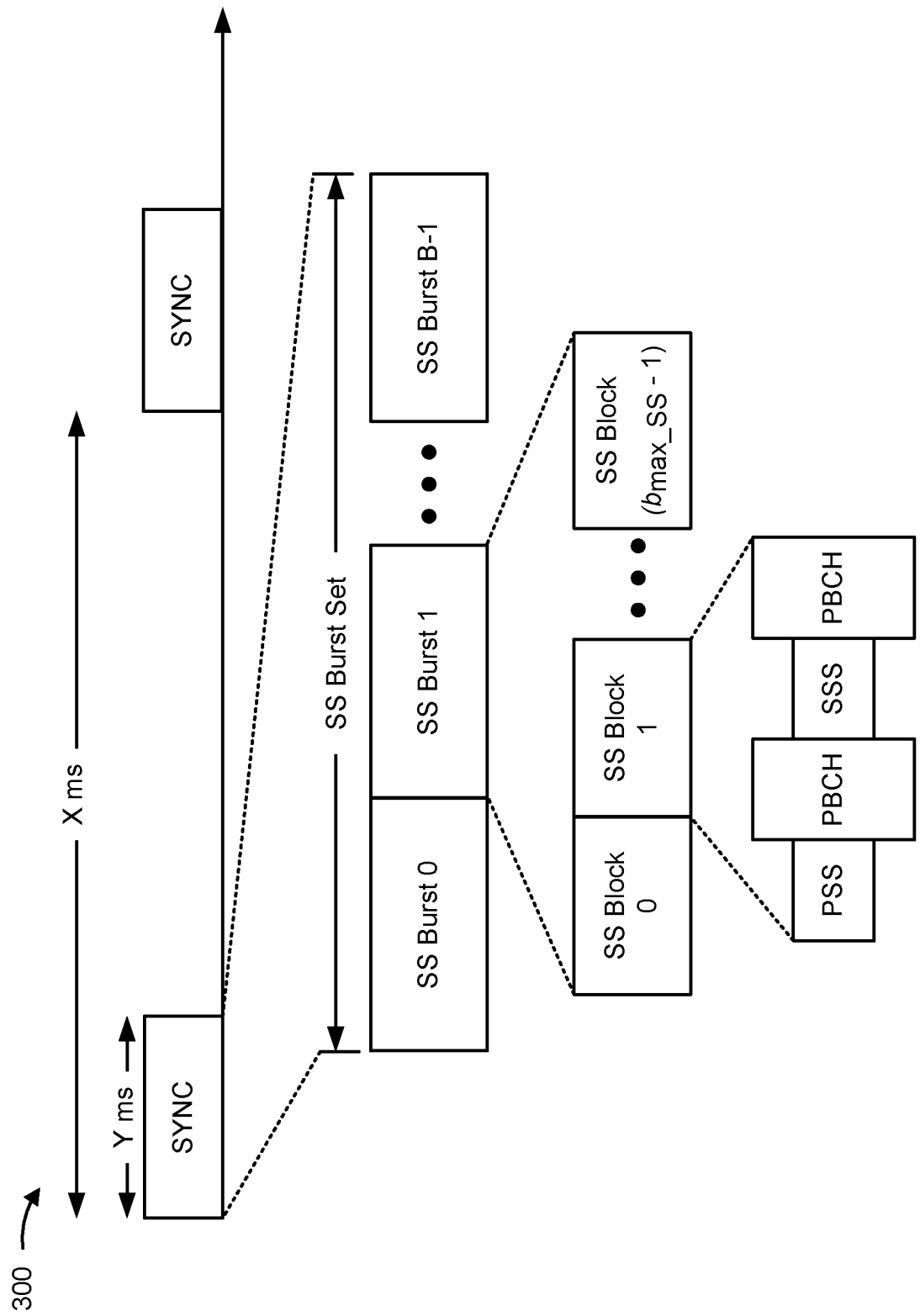
FIG. 3B is a diagram illustrating an example synchronization communication hierarchy in a wireless communication network, in accordance with the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block (bmax_SS-1), where bmax_SS-1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
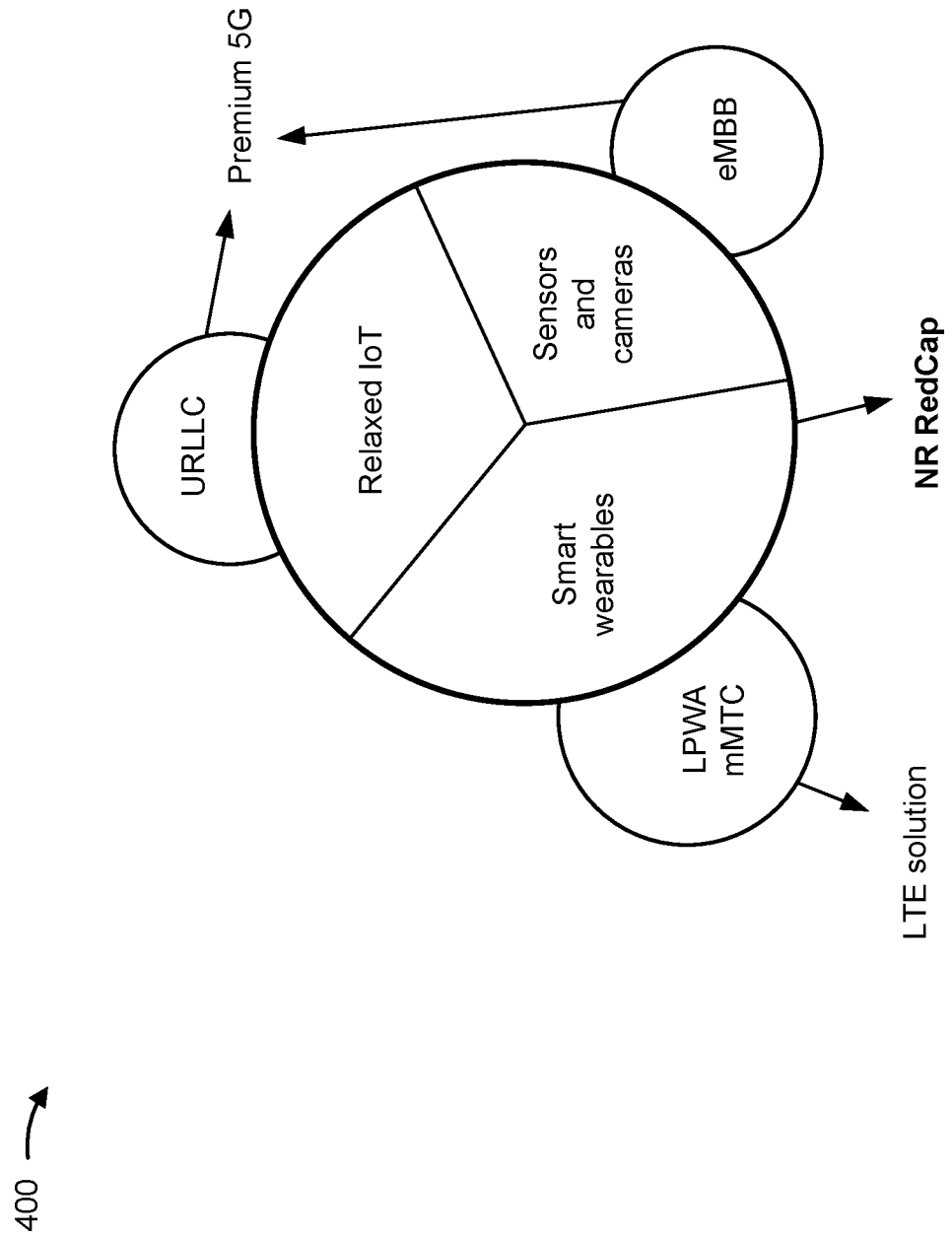
FIG. 4 is a diagram illustrating types of devices, in accordance with the present disclosure.

FIG. 4 is a diagram 400 illustrating types of devices, in accordance with the present disclosure.

As shown in FIG. 4, ultra-reliable low-latency communication (URLLC) devices and enhanced mobile broadband (eMBB) devices may be considered NR premium devices (e.g., UEs). Some devices, such as low power wide-area (LPWA) devices or massive machine type communication (mMTC) devices, may be considered enhanced LTE devices. FIG. 4 shows that some wireless communication devices are not NR premium UEs, but rather devices with reduced capabilities. Such devices with reduced capabilities may include relaxed internet of things (IoT) devices, smart wearables, sensors, and video surveillance cameras. Reduced capability devices may be referred to as NR RedCap devices, RedCap devices, Red Cap devices, Red-Cap devices, redcap devices, red cap devices, red-cap devices, and/or NR RedCap UEs. NR RedCap devices have also been referred to as NR Light devices or NR Lite devices. For purposes of explanation, the term NR RedCap UE may be used in the aspects described herein.

In some aspects, an NR RedCap UE may have reduced capabilities due to a capability or configuration that provides for less peak throughput, longer latency, less reliability, more power consumption efficiency, less system overhead, and/or less resource costs. An NR RedCap UE may be subject to relaxed latency or reliability requirements. In some aspects, an NR RedCap UE may have only one or two transmission or reception antennas.

In some aspects, an NR RedCap UE may have or be configured to use a subset of features available to NR premium UEs or other full-featured NR UEs that may be used for personal communication. In some aspects, an NR RedCap UE may have a mandatory set of features and an optional set of features, where one or more of the optional features in an NR RedCap UE are mandatory for NR premium UEs. In some aspects, a standard chart or matrix of features may be used to specify whether a device is an NR RedCap UE.

In some aspects, an NR RedCap UE may include wearable devices, such as smart watches, exercise monitors, medical devices, industrial sensors, surveillance cameras, low-end smartphones, and/or low end IoT devices.

As indicated above, FIG. 4 is provided as an example. Other examples may differ from what is described with regard to FIG. 4.

An NR RedCap UE, due to its reduced capability, may have difficulty handling complexities involving a large number of configurations, features, and/or options. For example, the NR RedCap UE may be required to handle a certain amount of complexity to switch between various numerologies, where a numerology includes a subcarrier spacing (SCS) and a cyclic prefix (CP) type, whether normal CP (NCP) or a larger extended CP (ECP). This complexity may involve retuning signaling hardware and software from one SCS to another SCS, and to alternate between an NCP and an ECP. Often, such retuning may not be necessary to fulfill tasks assigned to the NR RedCap UE, or to satisfy a required quality of communication. The NR RedCap UE may waste power, processing resources, and signaling resources in a configuration that involves full features for frequency tuning, transmission, and reception. This waste may be a disappointment in cases where the NR RedCap UE is unaware of features, numerologies, and/or configurations that the NR RedCap UE does not need to support.

According to various aspects described herein, an NR RedCap UE may determine a configuration from stored configuration information, such as information defined by a standard or provided by a base station during radio resource control configuration. The configuration may be NR RedCap specific and specify what the NR RedCap UE is to support or not support. This configuration may be indicated based at least in part on a UE capability of the NR RedCap UE that is communicated to a base station or network. As a result, the NR RedCap UE is able to use a subset of features or requirements, or down-select features to support. For example, a configuration may specify that the NR RedCap UE is to support only one numerology for certain use cases. The NR RedCap UE may not have to retune signaling hardware and software as often as a full featured UE. The NR RedCap UE may thus save power, processing resources, and signaling resources.

Figure 5:
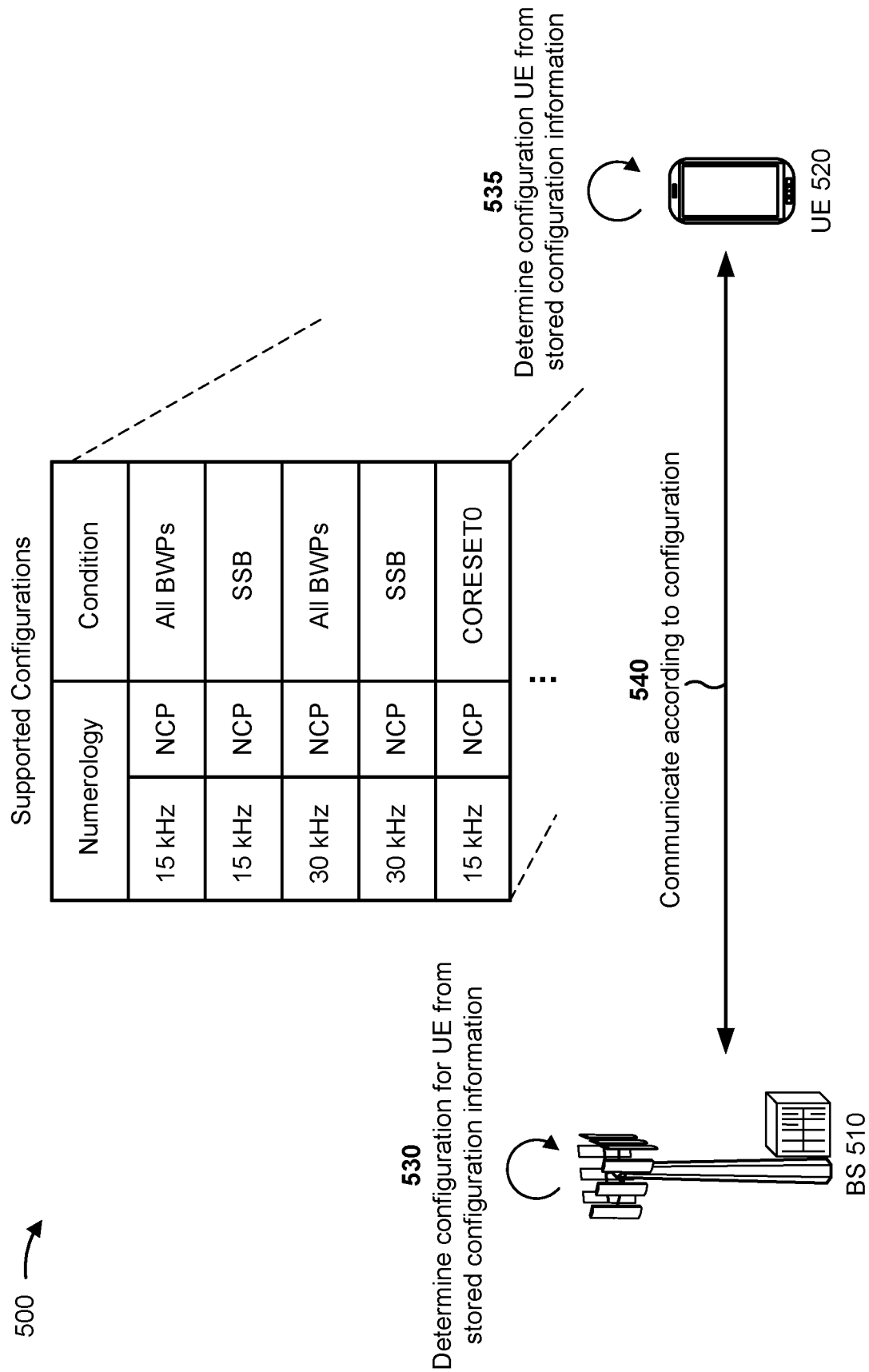
FIG. 5 is a diagram illustrating an example of configurations for New Radio (NR) RedCap devices, in accordance with the present disclosure.

FIG. 5 is a diagram illustrating an example 500 of configurations for NR RedCap devices, in accordance with the present disclosure. FIG. 5 shows a BS 510 (e.g., BS 110 depicted in FIGS. 1 and 2) that may communicate with a UE 520 (e.g., UE 120 depicted in FIGS. 1 and 2). UE 520 in FIG. 5 may be an NR RedCap UE.

As shown by reference number 530, BS 510 may determine a configuration for UE 520 from stored configuration information. The configuration may specify a subset of features that an NR UE with reduced capabilities is to support. In some aspects, BS 510 may indicate the configuration or information associated with the configuration to UE 520. As shown by reference number 535, UE 520 may determine the configuration from stored configuration information. The configuration may be indicated in, for example, a look up table (LUT). FIG. 5 shows an example LUT for supported configurations. For example, a configuration may specify one or more numerologies that UE 520 is to support or is not to support. The configuration may be specified for a certain use case or condition. The LUT in FIG. 5 shows that UE 520 is to support only a single numerology (e.g., 15 kHz SCS and NCP) for all bandwidth parts (BWPs) and for synchronization signals and a physical broadcast channel (SSB). This may be for each of multiple types of NR UE that include different capability levels. FIG. 5 shows a configuration that specifies that UE 520 is to support an SCS of 15 kHz and an SCS of 30 kHz. FIG. 5 also shows a configuration that specifies that UE 520 is to support a numerology of 15 kHz and NCP for CORESET0. The LUT in FIG. 5 shows a few examples of configurations, but other configurations may be specified, as described herein.

As shown by reference number 540, BS 510 and UE 520 may communicate according to the configuration specified for UE 520. By using a subset of features or available options, as specified by the configuration, UE 520 may save power, processing resources, and signaling resources.

In some aspects, UE 520 may report one or more UE capabilities based at least in part on a request from BS 510. UE 520 may report UE capabilities with one or more information elements specifying a particular set of UE features with reduced capabilities. BS 510 may transmit scheduling information that is compatible with the information elements.

As indicated above, FIG. 5 is provided as an example. Other examples may differ from what is described with regard to FIG. 5.

An NR RedCap UE, such as UE 520, may determine that the UE may need to support or not support various configurations associated with a numerology. In some aspects, it may be mandatory for NR RedCap UEs to support operation on FR1 licensed spectrum, including for all use cases. FR1 refers to frequency range 1, which may include a range of 410 MHz to 7.125 GHz. FR2, or frequency range 2, may include a range of 24.25 to 52.6 GHz. These ranges may vary in size based at least in part on standards or agreements. An NR RedCap UE may largely reduce resource cost and complexity when the NR RedCap UE operates on FR1 licensed spectrum.

In some aspects, an NR RedCap UE may support a subset of SCS combinations for SSB, CORESET0, and active downlink (DL)/uplink (UL) BWP. For example, the NR RedCap UE may support the same numerology for all BWPs and SSB. The NR RedCap UE may support the same numerology for SSB and CORESET0. The same numerology may be supported during initial access to a serving cell. The NR RedCap UE may support the same numerology in NR stand-alone mode or for NR-LTE dynamic spectrum sharing. Additionally, or alternatively, the NR RedCap UE may support no more than K different numerologies (e.g., maximum quantity of different numerologies). The maximum quantities of different numerologies may be specific to certain procedures, such as mobility measurement, cell selection, or cell re-selection. The quantity K may be greater than 0, and may be hard-coded in a LUT parameterized on the operating frequency bands of NR RedCap.

In some aspects, the NR RedCap UE may support numerologies with various combinations involving NCP and ECP. In some aspects, the NR RedCap UE may not be required to support 60 kHz SCS and ECP. In some aspects that may be associated with FR1, the NR RedCap UE may support 15 kHz and 30 kHz SCS with NCP for SSB, CORESET0, and active DL/UL BWP. The NR RedCap UE may support both 15 kHz and 30 kHz SCS and NCP. The NR RedCap UE may support either 15 kHz or 30 kHz SCS and NCP, but not both.

In some aspects, the NR RedCap UE may support 60 kHz and/or ECP. In some aspects, the NR RedCap UE may not support 60 kHz SCS, regardless of NCP or ECP. In some aspects, NR RedCap UE may support 60 kHz SCS, with NCP being optional and ECP not supported. In some aspects, the NR RedCap UE may support a reference SCS of 15 kHz or 30 kHz for a carrier resource block (CRB) grid, which may govern any offsets from an anchor frequency.

In some aspects associated with support for FR2, the NR RedCap UE may support 120 kHz SCS and NCP for SSB, CORESET0, and active DL/UL BWP. In some aspects, the NR RedCap UE may support 60 kHz or 240 kHz SCS. In some aspects, the NR RedCap UE may not support 240 kHz SCS for SSB and 60 kHz SCS for CORESET0 and ECP. In some aspects, the NR RedCap UE may support 240 kHz SCS for SSB and 60 or 120 kHz SCS and NCP for CORESET0, if 240 kHz SCS is used for SSB. In some aspects, the NR RedCap UE may support a reference SCS of 60 kHz or 120 kHz for a CRB grid.

In some aspects, the NR RedCap UE may support certain waveforms and MCSs. For example, the NR RedCap UE may support a CP orthogonal frequency division multiplexing (CP-OFDM) for both UL and DL. In some aspects, the NR RedCap UE may support a discrete fourier transform single OFDM (DFT-s-OFDM) waveform and/or other low peak-to-average power ratio waveforms for non-coherent communication on UL for a physical uplink shared channel (PUSCH) and/or a physical uplink control channel (PUCCH).

In some aspects, the NR RedCap UE may support MCSs on DL and UL, where a quantity of supported MCSs may be the same or may differ between UL and DL. In some aspects, the NR RedCap UE may support a modulation order equal to, or less than 64 order quadrature amplitude modulation (QAM-64). For example, the NR RedCap UE may support QAM-64 MCS for DL and low-SE QAM-64 MCS Table or CQI table (with or without transform precoding) for UL (Option 1). The NR RedCap UE may support QAM-64 MCS for DL and QAM-64 MCS (with or without transform precoding) for UL (Option 2). That is, the NR RedCap UE may support an MCS table or a CQI table associated with a relaxed modulation order for DL and for UL. A relaxed modulation order may refer to low spectral efficiency modulation for waveform generation and channel estimation, and the relaxed modulation order may affect the MCS and the CQI. The NR RedCap UE may support a subset of MCS entries and/or CQI entries in Options 1 or 2 for DL and UL. The NR RedCap UE may support a same or different quantity of MCSs or CQIs on DL and UL.

In some aspects, an NR RedCap UE may support different coverage recovery (CR) levels. CR levels include different procedures or thresholds for recovering from radio link failures. The NR RedCap UE may support a quantity of repetitions, a quantity of aggregation levels, a quantity of frequency hops, and/or a density of DMRS symbols corresponding to different CR levels supported by one or more types of NR UEs.

In some aspects, the NR RedCap UE may support an adaptable bandwidth for CORESET0 and a BWP configuration. For example, the BWP configuration for CORESET0 may specify that a target CR level is mapped to one of 24 RBs, 48 RBs, or 96 RBs.

FIG. 6 illustrates an example 600 of bandwidth and antenna configurations for an NR RedCap UE, in accordance with the present disclosure.

In some aspects, the NR RedCap UE may support reduced bandwidth and a reduced quantity of transmission and reception antennas. For example, at least for FR1, the NR RedCap UE may support a maximum bandwidth (DL or UL) of 20 MHz or 40 MHz. The NR RedCap UE may support a maximum bandwidth that is separately configured for DL and UL. For an NR RedCap UE with reduced bandwidth capability (e.g., down from 100 MHz for FR1), the maximum bandwidth in UL and DL may be reduced for control information or data. An NR RedCap UE with reduced bandwidth capability may not be expected to support carrier aggregation or dual connectivity, which may be required of non-NR RedCap UEs. In some embodiments, NR RedCap UE may support a maximum of one transmission antenna and a maximum of one or two reception antennas.

FIG. 6 shows other configurations the NR RedCap UE may support, based at least in part on a type of NR RedCap UE. Different types may have different subsets of features or limitations. For example, an NR RedCap UE that is a wearable device may support a DL peak rate of 150 Mbps, an UL peak rate of 50 Mbps, a bandwidth requirement of 20 MHz or 40 MHz, one transmission antenna, and one or two reception antennas. The wearable device may not support 256-QAM. The wearable device may have medium mobility and a high power saving requirement. In some aspects, an NR RedCap UE that is an industry sensor may support a DL peak rate of less than 2 Mbps, an UL peak rate of less than 5 Mbps, a bandwidth requirement of 5 MHz or 10 MHz, one transmission antenna, and one reception antenna. The sensor may not support 256-QAM. The sensor may have low mobility and a high power saving requirement. In some aspects, an NR RedCap UE that is a video surveillance camera may support a DL peak rate of less than 5 Mbps, an UL peak rate of less than 25 Mbps, a bandwidth requirement of 10 MHz or 20 MHz, one or two transmission antennas, and one reception antenna. The camera may not support 256-QAM. The camera may have low mobility and a high power saving requirement. In sum, the NR RedCap UE may have a determined configuration based at least in part on a type of NR RedCap UE. As a result, the NR RedCap UE may save power, processing resources, and signaling resources supporting a reduced set of features. In some aspects, an NR RedCap UE may support a same power saving mode, a same set of processing capabilities and timeline, or a set of fallback capabilities as another type of NR UE, which may also have reduced capabilities or may not have reduced capabilities. For example, an NR RedCap UE may have a set of reduced capabilities, but may fall back to a set of further reduced capabilities.

As indicated above, FIG. 6 is provided as an example. Other examples may differ from what is described with regard to FIG. 6.

Figure 7:
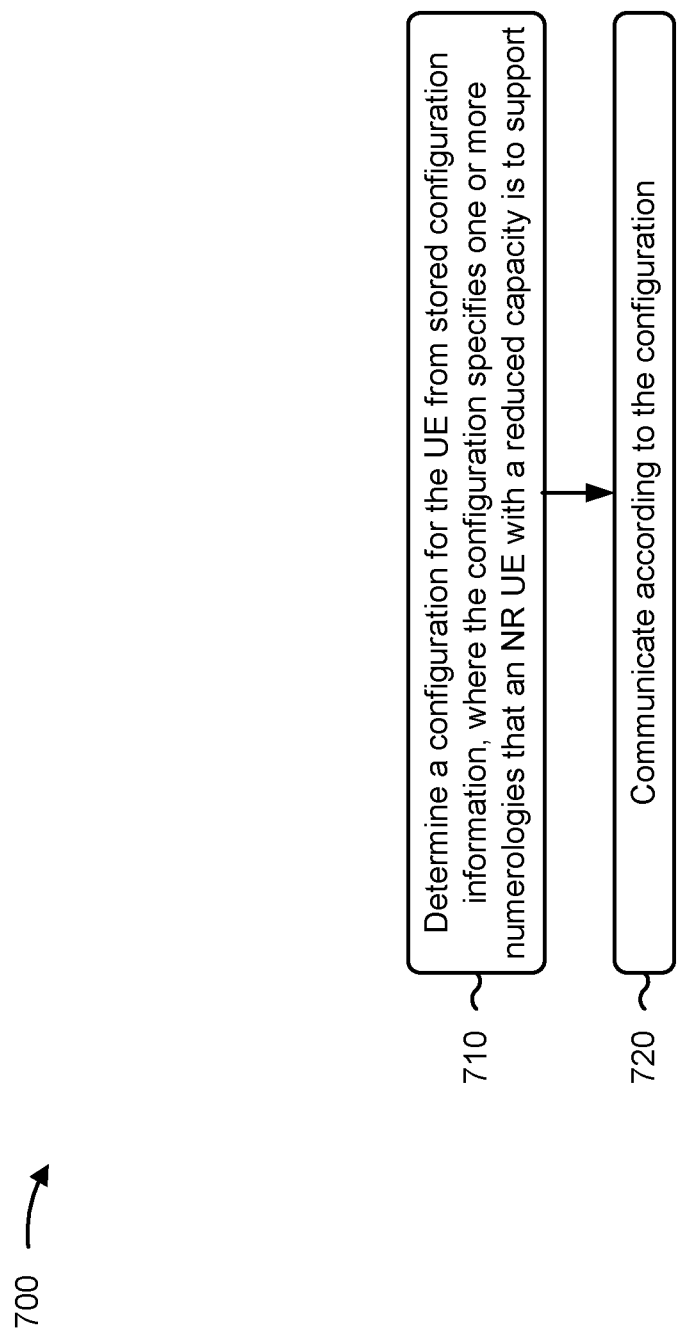
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., a UE 120 depicted in FIGS. 1 and 2, UE 520 depicted in FIG. 5) performs operations associated with configurations for NR RedCap devices.

As shown in FIG. 7, in some aspects, process 700 may include determining a configuration for the UE from stored configuration information (block 710). For example, the UE (e.g., using receive processor 258, transmit processor 264, controller/processor 280, memory 282) may determine a configuration for the UE from stored configuration information, as described above. In some aspects, the configuration specifies a subset of features that an NR UE with reduced capabilities is to support. In some aspects, the configuration specifies one or more numerologies that an NR UE with reduced capabilities is to support. In some aspects, a numerology, of the one or more numerologies, includes a supported SCS and CP.

As further shown in FIG. 7, in some aspects, process 700 may include communicating according to the configuration (block 720). For example, the UE (e.g., using receive processor 258, transmit processor 264, controller/processor 280, memory 282) may communicate according to the configuration, as described above.

Process 700 may include additional aspects, such as any single aspect or any combination of aspects described below and/or in connection with one or more other processes described elsewhere herein.

In some aspects, process 700 may include transmitting a report to a base station based at least in part on a request from the base station, where the report includes one or more information elements that specify the subset of features.

In a first aspect, the configuration specifies that the UE is to support a same numerology for all BWPs and for synchronization signals and a physical broadcast channel.

In a second aspect, alone or in combination with the first aspect, the configuration specifies that the UE is to support a same numerology for synchronization signals, a PBCH, and CORESET0.

In a third aspect, alone or in combination with one or more of the first and second aspects, the configuration specifies that the UE is to support up to a maximum quantity of different numerologies.

In a fourth aspect, alone or in combination with one or more of the first through third aspects, the configuration specifies that the UE is to support FR1 licensed spectrum.

In a fifth aspect, alone or in combination with one or more of the first through fourth aspects, the configuration specifies that the UE is to support normal CP and both 15 kHz SCS and 30 kHz SCS for synchronization signals, a PBCH, CORESET0, an active downlink BWP, and an active uplink BWP.

In a sixth aspect, alone or in combination with one or more of the first through fifth aspects, the configuration specifies that the UE is to support normal CP and one of 15 kHz SCS or 30 kHz SCS for synchronization signals, a PBCH, CORESET0, an active downlink BWP, and an active uplink BWP.

In a seventh aspect, alone or in combination with one or more of the first through sixth aspects, the configuration specifies that the UE is not to support 60 kHz SCS and normal CP or extended CP.

In an eighth aspect, alone or in combination with one or more of the first through seventh aspects, the configuration specifies that the UE is to support 60 kHz SCS and normal CP for synchronization signals, a PBCH, CORESET0, an active downlink BWP, and an active uplink BWP.

In a ninth aspect, alone or in combination with one or more of the first through eighth aspects, the configuration specifies that the UE is to support a reference SCS of 15 kHz or 30 kHz for a common resource block grid.

In a tenth aspect, alone or in combination with one or more of the first through ninth aspects, the configuration specifies that the UE is not to support 60 kHz SCS and extended CP.

In an eleventh aspect, alone or in combination with one or more of the first through tenth aspects, the configuration specifies that the UE is to support a limited subset of SCSs for FR2 licensed spectrum.

In a twelfth aspect, alone or in combination with one or more of the first through eleventh aspects, the configuration specifies that the UE is to support 120 kHz SCS and normal CP for synchronization signals, a PBCH, CORESET0, an active downlink BWP, and an active uplink BWP.

In a thirteenth aspect, alone or in combination with one or more of the first through twelfth aspects, the configuration specifies that the UE is not to support 240 kHz SCS for synchronization signals and a PBCH, and is not to support 60 kHz SCS and extended CP for CORESET0.

In a fourteenth aspect, alone or in combination with one or more of the first through thirteenth aspects, the configuration specifies that the UE is to support 240 kHz SCS for synchronization signals and a PBCH, and is to support 60 kHz or 120 kHz SCS and normal CP for CORESET0.

In a fifteenth aspect, alone or in combination with one or more of the first through fourteenth aspects, the configuration specifies that the UE is to support a reference SCS of 60 kHz or 120 kHz for a common resource block grid.

Although FIG. 7 shows example blocks of process 700, in some aspects, process 700 may include additional blocks, fewer blocks, different blocks, or differently arranged blocks than those depicted in FIG. 7. For example, process 700 may include one or more blocks of FIGS. 9, 11, 13. Additionally, or alternatively, two or more of the blocks of process 700 may be performed in parallel.

Figure 8:
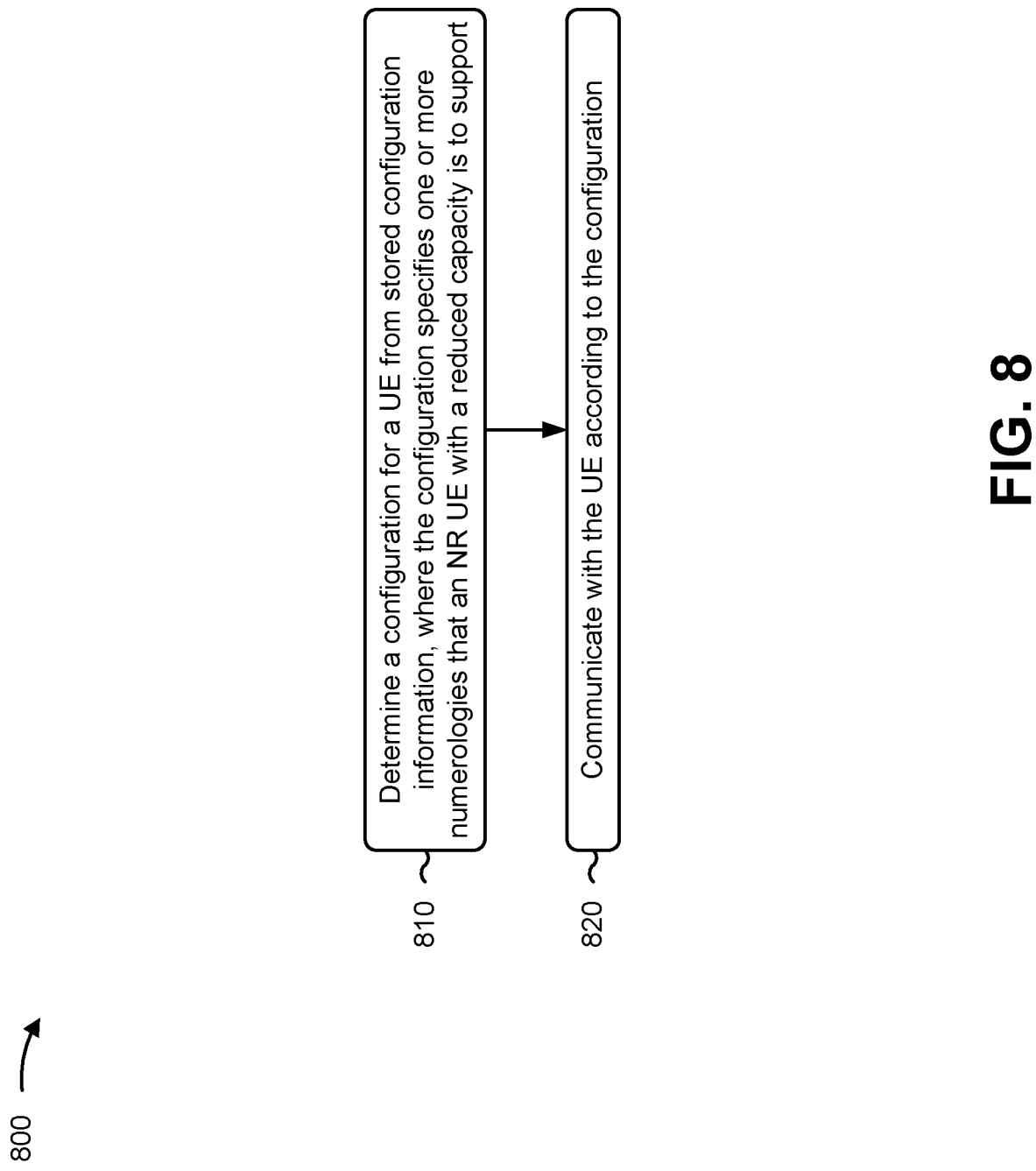
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., a BS 110 depicted in FIGS. 1 and 2, BS 510 depicted in FIG. 5) performs operations associated with configurations for NR RedCap devices.

As shown in FIG. 8, in some aspects, process 800 may include determining a configuration for a UE from stored configuration information (block 810). For example, the base station (e.g., using transmit processor 220, receive processor 238, controller/processor 240, memory 242) may determine a configuration for a UE from stored configuration information, as described above. In some aspects, the configuration specifies a subset of features that an NR UE with reduced capabilities is to support. In some aspects, the configuration specifies one or more numerologies that an NR UE with reduced capabilities is to support. In some aspects, a numerology, of the one or more numerologies, includes a supported SCS and CP.

As further shown in FIG. 8, in some aspects, process 800 may include communicating with the UE according to the configuration (block 820). For example, the base station (e.g., using transmit processor 220, receive processor 238, controller/processor 240, memory 242) may communicate with the UE according to the configuration, as described above.

Process 800 may include additional aspects, such as any single aspect or any combination of aspects described below and/or in connection with one or more other processes described elsewhere herein.

In some aspects, process 800 may include receiving a report from the UE, where the report includes one or more information elements that specify the subset of features.

In a first aspect, process 800 includes transmitting an indication of the configuration to the UE.

In a second aspect, alone or in combination with the first aspect, process 800 includes reducing a set of SCSs that the UE is to support.

In a third aspect, alone or in combination with one or more of the first and second aspects, the configuration specifies that the UE is to support a same numerology for all BWPs and for synchronization signals and a PBCH.

In a fourth aspect, alone or in combination with one or more of the first through third aspects, the configuration specifies that the UE is to support a same numerology for synchronization signals, a PBCH, and CORESET0.

In a fifth aspect, alone or in combination with one or more of the first through fourth aspects, the configuration specifies that the UE is to support up to a maximum quantity of different numerologies.

In a sixth aspect, alone or in combination with one or more of the first through fifth aspects, the configuration specifies that the UE is to support FR1 licensed spectrum.

In a seventh aspect, alone or in combination with one or more of the first through sixth aspects, the configuration specifies that the UE is to support normal CP and both 15 kHz SCS and 30 kHz SCS for synchronization signals, a PBCH, CORESET0, an active downlink BWP, and an active uplink BWP.

In an eighth aspect, alone or in combination with one or more of the first through seventh aspects, the configuration specifies that the UE is to support normal CP and one of 15 kHz SCS or 30 kHz SCS for synchronization signals, a PBCH, CORESET0, an active downlink BWP, and an active uplink BWP.

In a ninth aspect, alone or in combination with one or more of the first through eighth aspects, the configuration specifies that the UE is not to support 60 kHz SCS and normal CP or extended CP.

In a tenth aspect, alone or in combination with one or more of the first through ninth aspects, the configuration specifies that the UE is to support 60 kHz SCS and normal CP for synchronization signals, a PBCH, CORESET0, an active downlink BWP, and an active uplink BWP.

In an eleventh aspect, alone or in combination with one or more of the first through tenth aspects, the configuration specifies that the UE is to support a reference SCS of 15 kHz or 30 kHz for a common resource block grid.

In a twelfth aspect, alone or in combination with one or more of the first through eleventh aspects, the configuration specifies that the UE is not to support 60 kHz SCS and extended CP.

In a thirteenth aspect, alone or in combination with one or more of the first through twelfth aspects, the configuration specifies that the UE is to support a limited subset of SCSs for FR2 licensed spectrum.

In a fourteenth aspect, alone or in combination with one or more of the first through thirteenth aspects, the configuration specifies that the UE is to support 120 kHz SCS and normal CP for synchronization signals, a PBCH, CORESET0, an active downlink BWP, and an active uplink BWP.

In a fifteenth aspect, alone or in combination with one or more of the first through fourteenth aspects, the configuration specifies that the UE is not to support 240 kHz SCS for synchronization signals and a PBCH, and does not support 60 kHz SCS and extended CP for CORESET0.

In a sixteenth aspect, alone or in combination with one or more of the first through fifteenth aspects, the configuration specifies that the UE is to support 240 kHz SCS for synchronization signals and a PBCH, and support 60 kHz or 120 kHz SCS and normal CP for CORESET0.

In a seventeenth aspect, alone or in combination with one or more of the first through sixteenth aspects, the configuration specifies that the UE is to support a reference SCS of 60 kHz or 120 kHz for a common resource block grid.

Although FIG. 8 shows example blocks of process 800, in some aspects, process 800 may include additional blocks, fewer blocks, different blocks, or differently arranged blocks than those depicted in FIG. 8. For example, process 800 may include one or more blocks of FIGS. 10, 12, 14. Additionally, or alternatively, two or more of the blocks of process 800 may be performed in parallel.

Figure 9:
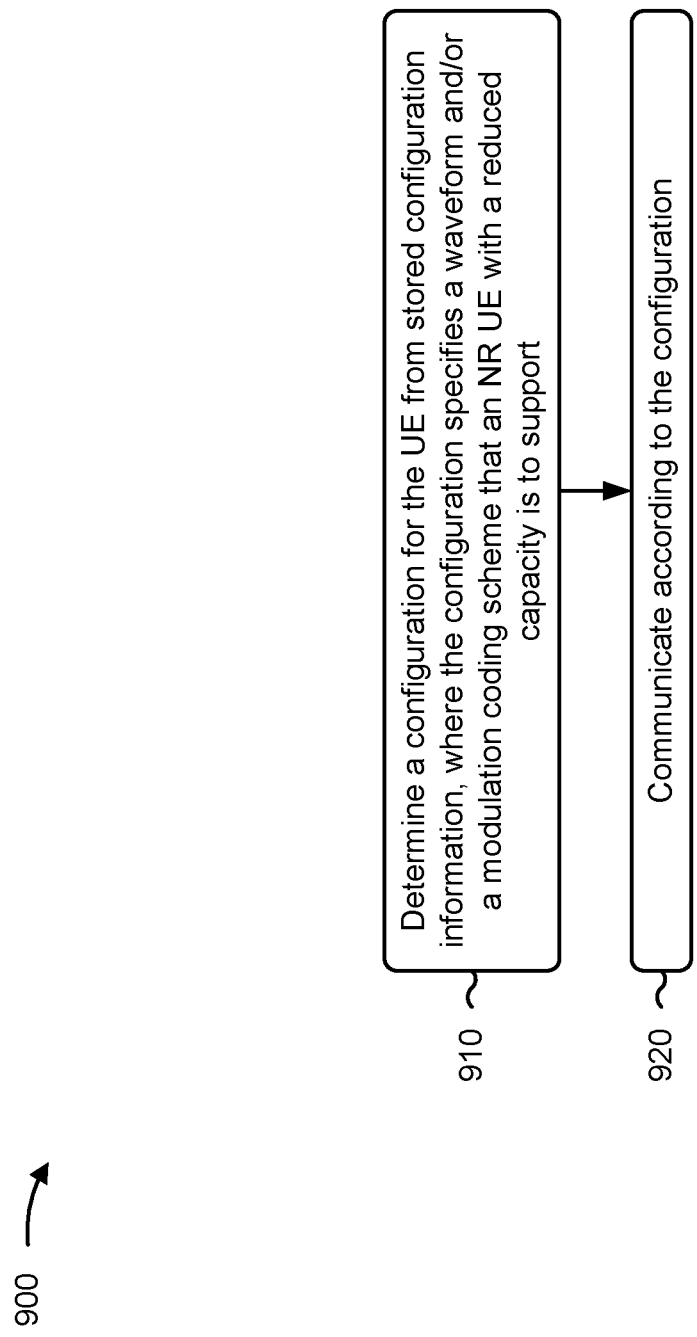
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120 depicted in FIGS. 1 and 2, UE 520 depicted in FIG. 5) performs operations associated with configurations for NR RedCap devices.

As shown in FIG. 9, in some aspects, process 900 may include determining a configuration for the UE from stored configuration information, wherein the configuration specifies one or more of a waveform or an MCS that an NR UE with reduced capabilities is to support (block 910). For example, the UE (e.g., using receive processor 258, transmit processor 264, controller/processor 280, memory 282) may determine a configuration for the UE from stored configuration information, as described above. In some aspects, the configuration specifies one or more of a waveform or an MCS that an NR UE with reduced capabilities is to support.

As further shown in FIG. 9, in some aspects, process 900 may include communicating according to the configuration (block 920). For example, the UE (e.g., using receive processor 258, transmit processor 264, controller/processor 280, memory 282) may communicate according to the configuration, as described above.

Process 900 may include additional aspects, such as any single aspect or any combination of aspects described below and/or in connection with one or more other processes described elsewhere herein.

In a first aspect, the configuration specifies that the UE is to support a CP-OFDM waveform on both downlink and uplink.

In a second aspect, alone or in combination with the first aspect, the configuration specifies that the UE is to support a DFT-s-OFDM waveform on uplink for one or more of a PUSCH or a PUCCH.

In a third aspect, alone or in combination with one or more of the first and second aspects, the configuration specifies that the UE is to support a low peak to average power ratio waveform on uplink for one or more of a PUSCH or a PUCCH.

In a fourth aspect, alone or in combination with one or more of the first through third aspects, the configuration specifies that the UE is to support a QAM-64 MCS for downlink and a low spectral efficiency QAM-64 MCS for uplink.

In a fifth aspect, alone or in combination with one or more of the first through fourth aspects, the configuration specifies that the UE is to support a QAM-64 MCS for downlink and for uplink.

In a sixth aspect, alone or in combination with one or more of the first through fifth aspects, the configuration specifies that the UE is to support a subset of possible MCSs for downlink and for uplink.

In a seventh aspect, alone or in combination with one or more of the first through sixth aspects, a quantity of MCSs that the UE is to support for downlink is different than a quantity of MCSs that the UE is to support for uplink.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
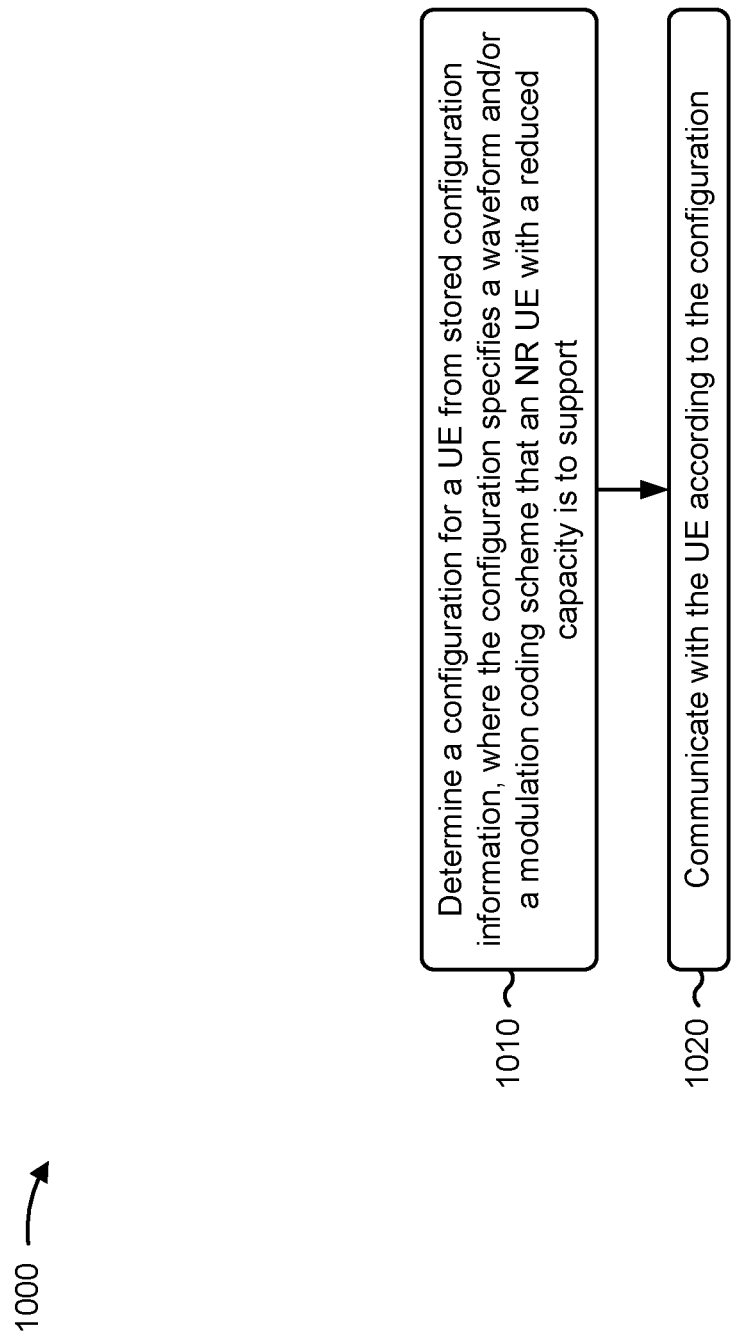
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., a BS 110 depicted in FIGS. 1 and 2, BS 510 depicted in FIG. 5) performs operations associated with configurations for NR RedCap devices.

As shown in FIG. 10, in some aspects, process 1000 may include determining a configuration for a UE from stored configuration information, wherein the configuration specifies one or more of a waveform or an MCS that an NR UE with reduced capabilities is to support (block 1010). For example, the base station (e.g., using transmit processor 220, receive processor 238, controller/processor 240, memory 242) may determine a configuration for a UE from stored configuration information, as described above. In some aspects, the configuration specifies one or more of a waveform or an MCS that an NR UE with reduced capabilities is to support.

As further shown in FIG. 10, in some aspects, process 1000 may include communicating with the UE according to the configuration (block 1020). For example, the base station (e.g., using transmit processor 220, receive processor 238, controller/processor 240, memory 242) may communicate with the UE according to the configuration, as described above.

Process 1000 may include additional aspects, such as any single aspect or any combination of aspects described below and/or in connection with one or more other processes described elsewhere herein.

In a first aspect, process 1000 includes transmitting an indication of the configuration to the UE.

In a second aspect, alone or in combination with the first aspect, process 1000 includes reducing a set of MCSs that the UE is to support.

In a third aspect, alone or in combination with one or more of the first and second aspects, the configuration specifies that the UE is to support a CP-OFDM waveform on both downlink and uplink.

In a fourth aspect, alone or in combination with one or more of the first through third aspects, the configuration specifies that the UE is to support a DFT-s-OFDM waveform on uplink for one or more of a PUSCH or PUCCH.

In a fifth aspect, alone or in combination with one or more of the first through fourth aspects, the configuration specifies that the UE is to support a low peak to average power ratio waveform on uplink for one or more of a PUSCH or PUCCH.

In a sixth aspect, alone or in combination with one or more of the first through fifth aspects, the configuration specifies that the UE is to support a QAM-64 MCS for downlink and a low spectral efficiency QAM-64 MCS for uplink.

In a seventh aspect, alone or in combination with one or more of the first through sixth aspects, the configuration specifies that the UE is to support a QAM-64 MCS for downlink and for uplink.

In an eighth aspect, alone or in combination with one or more of the first through seventh aspects, the configuration specifies that the UE is to support a subset of possible MCSs for downlink and for uplink.

In a ninth aspect, alone or in combination with one or more of the first through eighth aspects, a quantity of MCSs that the UE is to support for downlink is different than a quantity of MCSs that the UE is to support for uplink.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
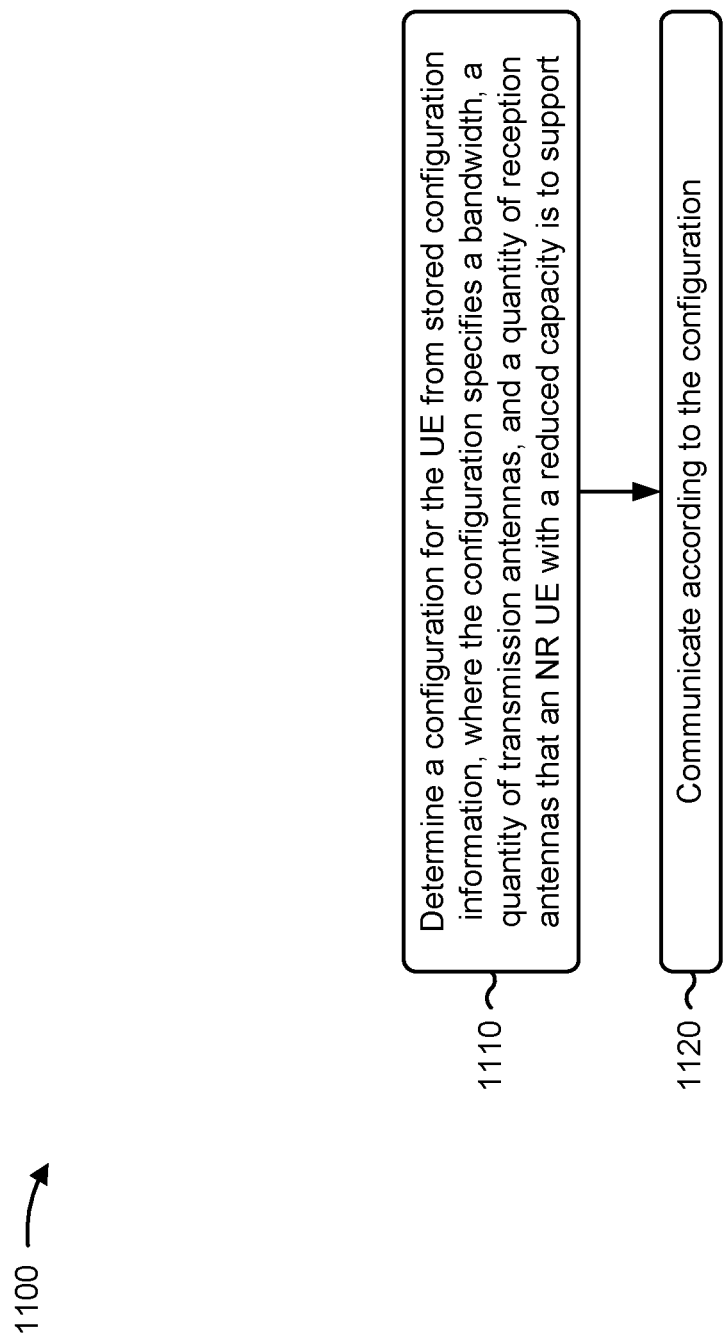
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., a UE 120 depicted in FIGS. 1 and 2, UE 520 depicted in FIG. 5) performs operations associated with configurations for NR RedCap devices.

As shown in FIG. 11, in some aspects, process 1100 may include determining a configuration for the UE from stored configuration information (block 1110). For example, the UE (e.g., using receive processor 258, transmit processor 264, controller/processor 280, memory 282) may determine a configuration for the UE from stored configuration information, as described above. In some aspects, the configuration specifies a bandwidth, a quantity of transmission antennas, and a quantity of reception antennas that an NR UE with reduced capabilities is to support.

As further shown in FIG. 11, in some aspects, process 1100 may include communicating according to the configuration (block 1120). For example, the UE (e.g., using receive processor 258, transmit processor 264, controller/processor 280, memory 282, and/or the like) may communicate according to the configuration, as described above.

Process 1100 may include additional aspects, such as any single aspect or any combination of aspects described below and/or in connection with one or more other processes described elsewhere herein.

In a first aspect, the configuration specifies that the UE is to support FR1 licensed spectrum, and support a maximum bandwidth of one of 20 MHz or 40 MHz.

In a second aspect, alone or in combination with the first aspect, the configuration specifies that the UE is to support a maximum bandwidth of one of 20 MHz or 40 MHz for uplink, and support a maximum bandwidth of one of 20 MHz or 40 MHz for downlink.

In a third aspect, alone or in combination with one or more of the first and second aspects, the configuration specifies that the UE is to support a maximum of one transmission antenna and a maximum of one or two reception antennas.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
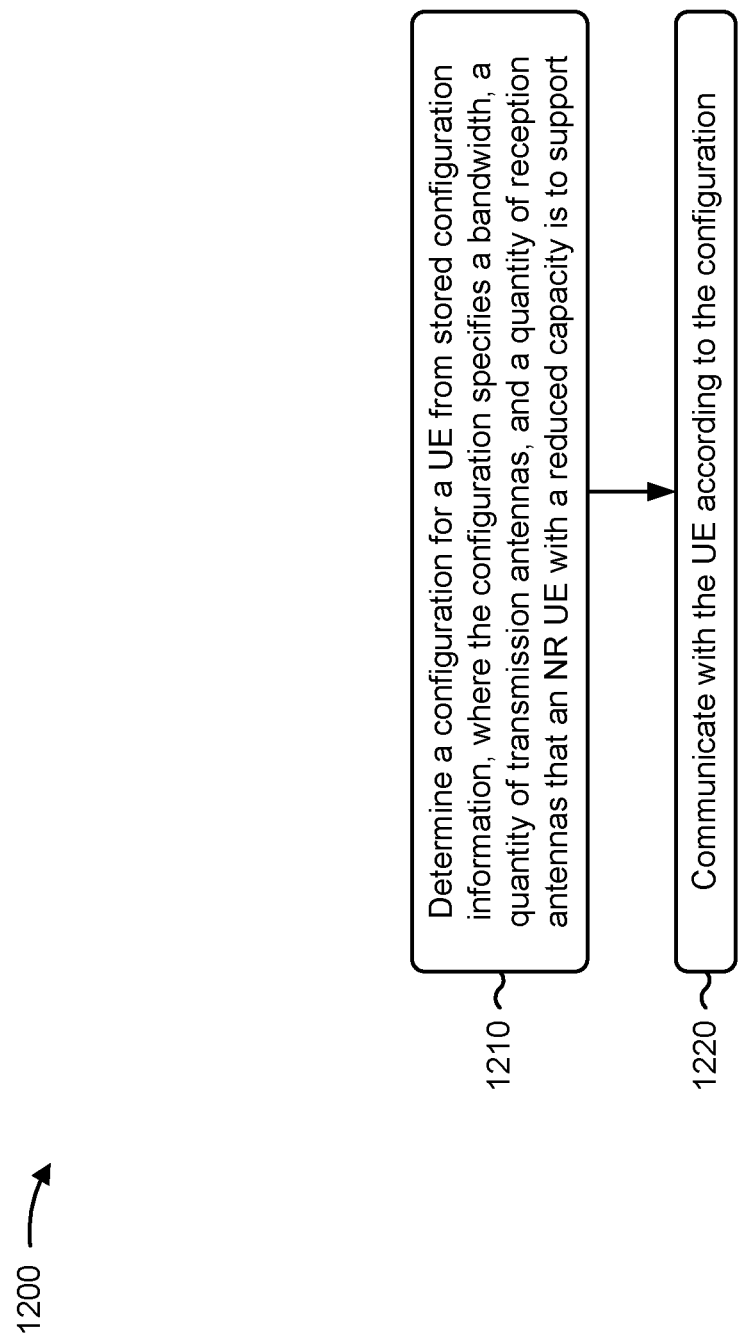
FIG. 12 is a diagram illustrating an example process performed, for example, by a base station, in accordance with the present disclosure.

FIG. 12 is a diagram illustrating an example process 1200 performed, for example, by a base station, in accordance with the present disclosure. Example process 1200 is an example where the base station (e.g., a BS 110 depicted in FIGS. 1 and 2, BS 510 depicted in FIG. 5) performs operations associated with configurations for NR RedCap devices.

As shown in FIG. 12, in some aspects, process 1200 may include determining a configuration for a UE from stored configuration information (block 1210). For example, the base station (e.g., using transmit processor 220, receive processor 238, controller/processor 240, memory 242) may determine a configuration for a UE from stored configuration information, as described above. In some aspects, the configuration specifies a bandwidth, a quantity of transmission antennas, and a quantity of reception antennas that an NR UE with reduced capabilities is to support.

As further shown in FIG. 12, in some aspects, process 1200 may include communicating with the UE according to the configuration (block 1220). For example, the base station (e.g., using transmit processor 220, receive processor 238, controller/processor 240, memory 242) may communicate with the UE according to the configuration, as described above.

Process 1200 may include additional aspects, such as any single aspect or any combination of aspects described below and/or in connection with one or more other processes described elsewhere herein.

In a first aspect, process 1200 includes transmitting an indication of the configuration to the UE.

In a second aspect, alone or in combination with the first aspect, process 1200 includes reducing one or more of a quantity of transmission antennas or a quantity of reception antennas that the UE is to support.

In a third aspect, alone or in combination with one or more of the first and second aspects, process 1200 includes reducing a maximum bandwidth that the UE is to support.

In a fourth aspect, alone or in combination with one or more of the first through third aspects, the configuration specifies that the UE is to support FR1 licensed spectrum, and support a maximum bandwidth of one of 20 MHz or 40 MHz.

In a fifth aspect, alone or in combination with one or more of the first through fourth aspects, the configuration specifies that the UE is to support a maximum bandwidth of one of 20

MHz or 40 MHz for uplink, and support a maximum bandwidth of one of 20 MHz or 40 MHz for downlink.

In a sixth aspect, alone or in combination with one or more of the first through fifth aspects, the configuration specifies that the UE is to support a maximum of one transmission antenna and a maximum of one or two reception antennas.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
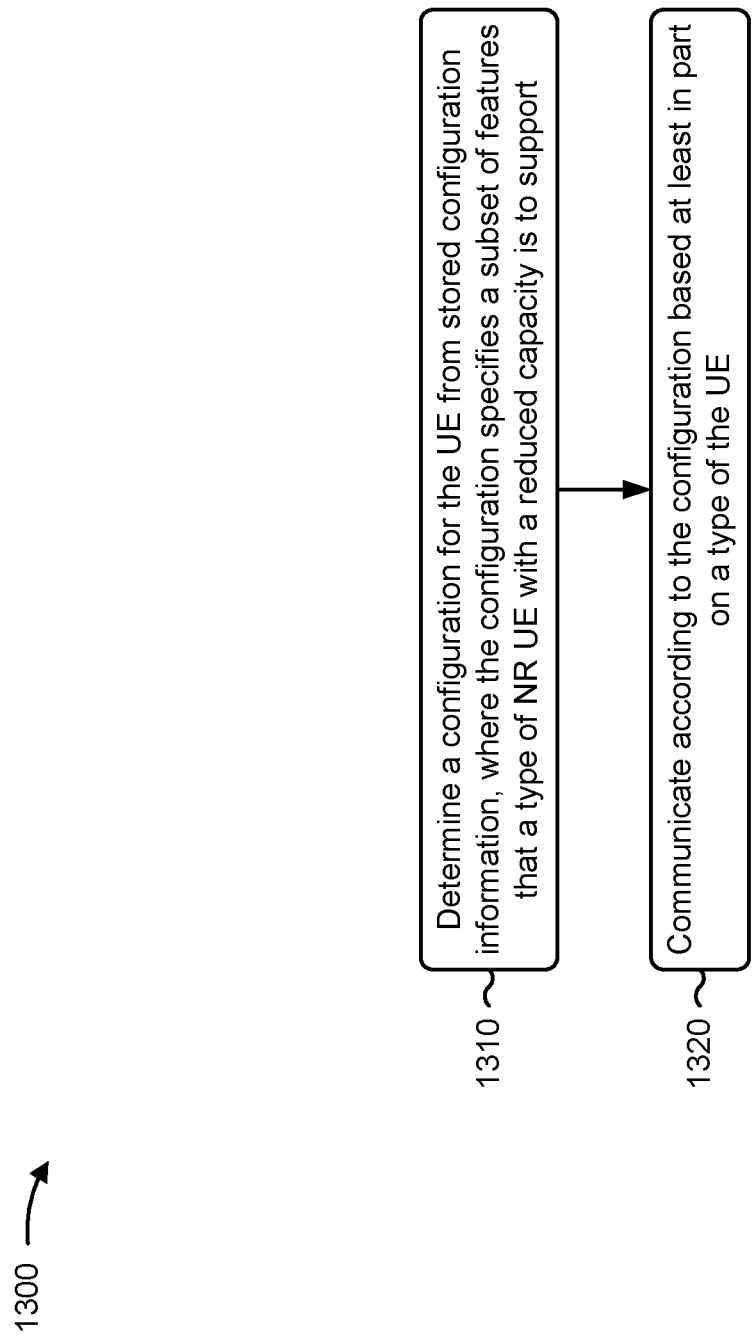
FIG. 13 is a diagram illustrating an example process performed, for example, by a UE, in accordance with the present disclosure.

FIG. 13 is a diagram illustrating an example process 1300 performed, for example, by a UE, in accordance with the present disclosure. Example process 1300 is an example where the UE (e.g., a UE 120 depicted in FIGS. 1 and 2, UE 520 depicted in FIG. 5) performs operations associated with configurations for NR RedCap devices.

As shown in FIG. 13, in some aspects, process 1300 may include determining a configuration for the UE from stored configuration information (block 1310). For example, the UE (e.g., using receive processor 258, transmit processor 264, controller/processor 280, memory 282) may determine a configuration for the UE from stored configuration information, as described above. In some aspects, the configuration specifies a subset of features that a type of NR UE with reduced capabilities is to support.

As further shown in FIG. 13, in some aspects, process 1300 may include communicating according to the configuration based at least in part on a type of the UE (block 1320). For example, the UE (e.g., using receive processor 258, transmit processor 264, controller/processor 280, memory 282) may communicate according to the configuration based at least in part on a type of the UE, as described above.

Process 1300 may include additional aspects, such as any single aspect or any combination of aspects described below and/or in connection with one or more other processes described elsewhere herein.

In a first aspect, process 1300 includes transmitting a report to a base station based at least in part on a request from the base station, where the report includes one or more information elements that specify the subset of features, and receiving scheduling information compatible with the one or more information elements that specify the subset of features.

In a second aspect, alone or in combination with the first aspect, the configuration specifies that the UE is to support a same numerology for one or more of synchronization signals, a PBCH, or CORESET0 during initial access to a serving cell.

In a third aspect, alone or in combination with one or more of the first and second aspects, the configuration specifies that the UE is to support up to a maximum quantity of different numerologies for one or more of mobility measurement, cell selection, or cell re-selection.

In a fourth aspect, alone or in combination with one or more of the first through third aspects, the configuration specifies one or more of a waveform or a MCS that an NR UE with reduced capabilities is to support.

In a fifth aspect, alone or in combination with one or more of the first through fourth aspects, the configuration specifies that the UE is to support a low peak to average power ratio waveform on uplink for one or more of a PUSCH or a PUCCH.

In a sixth aspect, alone or in combination with one or more of the first through fifth aspects, the configuration specifies that the UE is to support a QAM-64 MCS for downlink and a low spectral efficiency QAM-64 MCS for uplink.

In a seventh aspect, alone or in combination with one or more of the first through sixth aspects, the configuration specifies that the UE is to support a QAM-64 MCS for downlink and for uplink.

In an eighth aspect, alone or in combination with one or more of the first through seventh aspects, the configuration specifies that the UE is to support one or more of an MCS table or a CQI table associated with a relaxed modulation order for downlink and for uplink.

In a ninth aspect, alone or in combination with one or more of the first through eighth aspects, the configuration specifies that the UE is to support a subset of possible MCSs or CQIs for downlink and for uplink.

In a tenth aspect, alone or in combination with one or more of the first through ninth aspects, a quantity of MCSs that the UE is to support for downlink is different than a quantity of MCSs or channel quality indicators that the UE is to support for uplink.

In an eleventh aspect, alone or in combination with one or more of the first through tenth aspects, the configuration specifies a bandwidth, a quantity of transmission antennas, and a quantity of reception antennas that an NR UE with reduced capabilities is to support.

In a twelfth aspect, alone or in combination with one or more of the first through eleventh aspects, the configuration specifies that the UE is to support FR1 licensed spectrum, and support a maximum bandwidth of one of 20 MHz or 40 MHz.

In a thirteenth aspect, alone or in combination with one or more of the first through twelfth aspects, the configuration specifies that the UE is to support a reduction of bandwidth capability.

In a fourteenth aspect, alone or in combination with one or more of the first through thirteenth aspects, the configuration specifies that the UE is to support a maximum of one transmission antenna and a maximum of one or two reception antennas.

In a fifteenth aspect, alone or in combination with one or more of the first through fourteenth aspects, the subset of features corresponds to a type of NR UE with reduced capabilities, and where communicating according to the configuration includes communicating according to the configuration based at least in part on a type of the UE.

In a sixteenth aspect, alone or in combination with one or more of the first through fifteenth aspects, the configuration specifies that the UE is to support a single design for synchronization signals and a PBCH for each of a plurality of types of NR UE that include different capability levels.

In a seventeenth aspect, alone or in combination with one or more of the first through sixteenth aspects, the configuration specifies that the UE is to support one or more of a plurality of different CR levels and one or more of a quantity of repetitions, a quantity of aggregation levels, a quantity of frequency hops, or a density of DMRS symbols corresponding to different CR levels supported by one or more types of NR UEs.

In an eighteenth aspect, alone or in combination with one or more of the first through seventeenth aspects, the configuration specifies that the UE is to support an adaptable bandwidth for CORESET0 and a BWP configuration, based at least in part on a target CR level.

In a nineteenth aspect, alone or in combination with one or more of the first through eighteenth aspects, the BWP configuration for CORESET0 specifies that a target CR level is mapped to one of 24 RBs, 48 RBs, or 96 RBs.

In a twentieth aspect, alone or in combination with one or more of the first through nineteenth aspects, the configuration specifies that the UE is to support an adaptable time domain repetition level for one or more of a synchronization signal burst, a group common PDCCH, a multicast or broadcast PDSCH, a positioning reference signal, a channel state information reference signal (CSI-RS), a physical random access channel (PRACH), a PUSCH, or a PUCCH based at least in part on a target CR level.

In a twenty-first aspect, alone or in combination with one or more of the first through twentieth aspects, the configuration specifies that a type of NR UE with reduced capabilities is to support a same power saving mode, a same set of processing capabilities and timeline, or a set of fallback capabilities as another type of NR UE (e.g., another type of NR UE with reduced capabilities, NR UE without reduced capabilities).

In a twenty-second aspect, alone or in combination with one or more of the first through twenty-first aspects, process 1300 includes transmitting an indication of one or more of a half-duplex operation type or a reduced radio resource management measurement in an information element.

In a twenty-third aspect, alone or in combination with one or more of the first through twenty-second aspects, the configuration specifies that the UE is to support a single design for synchronization signals and a physical broadcast channel for each of a plurality of types of NR UE.

In a twenty-fourth aspect, alone or in combination with one or more of the first through twenty-third aspects, the configuration specifies that the UE is to support one or more of a plurality of different CR levels supported by one or more types of NR UEs.

In a twenty-fifth aspect, alone or in combination with one or more of the first through twenty-fourth aspects, the configuration specifies that the UE is to support an adaptable bandwidth for CORESET0, based at least in part on a target CR level.

In a twenty-sixth aspect, alone or in combination with one or more of the first through twenty-fifth aspects, the configuration specifies that the target CR level is one of 24 RBs, 48 RBs, or 96 RBs.

In a twenty-seventh aspect, alone or in combination with one or more of the first through twenty-sixth aspects, the configuration specifies that the UE is to support an adaptable time domain repetition level for a synchronization signal burst, based at least in part on the target CR level.

In a twenty-eighth aspect, alone or in combination with one or more of the first through twenty-seventh aspects, the configuration specifies that an industrial sensor type of NR UE is to support a same power saving or a same fallback capability as a wearable device type of NR UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
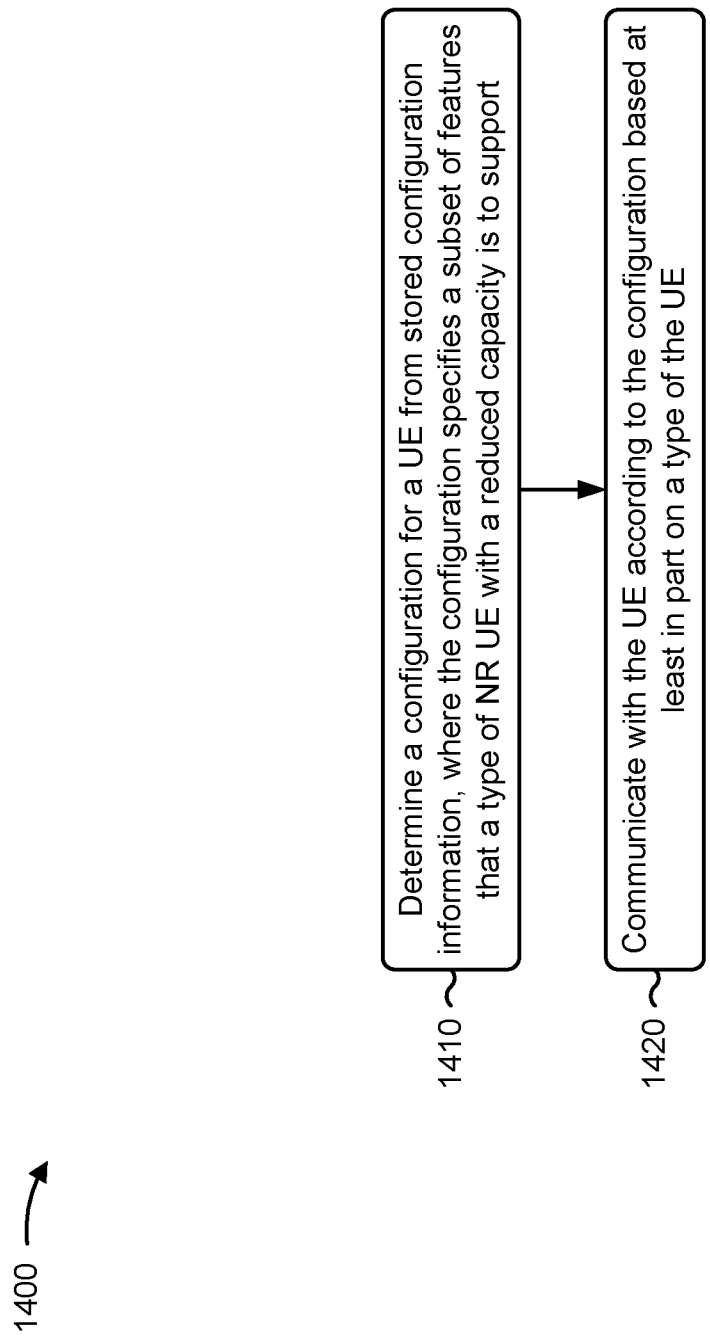
FIG. 14 is a diagram illustrating an example process performed, for example, by a base station, in accordance with the present disclosure.

FIG. 14 is a diagram illustrating an example process 1400 performed, for example, by a base station, in accordance with the present disclosure. Example process 1400 is an example where the base station (e.g., BS 110 depicted in FIGS. 1 and 2, BS 510 depicted in FIG. 5, and/or the like) performs operations associated with configurations for NR RedCap devices.

As shown in FIG. 14, in some aspects, process 1400 may include determining a configuration for a UE from stored configuration information (block 1410). For example, the base station (e.g., using transmit processor 220, receive processor 238, controller/processor 240, memory 242, and/or the like) may determine a configuration for a UE from stored configuration information, as described above. In some aspects, the configuration specifies a subset of features that a type of NR UE with reduced capabilities is to support.

As further shown in FIG. 14, in some aspects, process 1400 may include communicating with the UE according to the configuration based at least in part on a type of the UE (block 1420). For example, the base station (e.g., using transmit processor 220, receive processor 238, controller/processor 240, memory 242, and/or the like) may communicate with the UE according to the configuration based at least in part on a type of the UE, as described above.

Process 1400 may include additional aspects, such as any single aspect or any combination of aspects described below and/or in connection with one or more other processes described elsewhere herein.

In a first aspect, process 1400 includes receiving a report from the UE, wherein the report includes one or more information elements that specify the subset of features, and transmitting an indication of the configuration to the UE.

In a second aspect, alone or in combination with the first aspect, the configuration specifies that the UE is to support a same numerology for one or more of synchronization signals, a PBCH, or CORESET0 during initial access to a serving cell.

In a third aspect, alone or in combination with one or more of the first and second aspects, the configuration specifies that the UE is to support up to a maximum quantity of different numerologies for one or more of mobility measurement, cell selection, or cell re-selection.

In a fourth aspect, alone or in combination with one or more of the first through third aspects, the configuration specifies that the UE is to support one or more of a MCS table or a CQI table associated with a relaxed modulation order for downlink and for uplink.

In a fifth aspect, alone or in combination with one or more of the first through fourth aspects, the configuration specifies that the UE is to support one or more of a plurality of different CR levels and one or more of a quantity of repetitions, a quantity of aggregation levels, a quantity of frequency hops, or a density of DMRS symbols corresponding to different CR levels supported by one or more types of NR UEs.

In a sixth aspect, alone or in combination with one or more of the first through fifth aspects, the configuration specifies that a type of NR UE with reduced capabilities is to support a same power saving mode, a same set of processing capabilities and timeline, or a set of fallback capabilities as another type of NR UE.

In a seventh aspect, alone or in combination with one or more of the first through eighth aspects, the configuration specifies that the UE is to support a single design for synchronization signals and a PBCH for each of a plurality of types of NR UE.

In an eighth aspect, alone or in combination with one or more of the first through seventh aspects, the configuration specifies that the UE is to support one or more of a plurality of different CR levels supported by one or more types of NR UEs.

In a ninth aspect, alone or in combination with one or more of the first through eighth aspects, the configuration specifies that the UE is to support an adaptable bandwidth for CORESET0, based at least in part on a target CR level.

In a tenth aspect, alone or in combination with one or more of the first through ninth aspects, the configuration specifies that a target CR level is one of 24 RBs, 48 RBs, or 96 RBs.

In a eleventh aspect, alone or in combination with one or more of the first through tenth aspects, the configuration specifies that the UE is to support an adaptable time domain repetition level for a synchronization signal burst, based at least in part on a target CR level.

In a twelfth aspect, alone or in combination with one or more of the first through eleventh aspects, the configuration specifies that an industrial sensor type of NR UE may support a same power saving or a same fallback capability as a wearable device type of NR UE.

In a thirteenth aspect, alone or in combination with one or more of the first through twelfth aspects, process 1400 includes receiving an indication of one or more of a half-duplex operation type or a reduced radio resource management measurements in an information element.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

In some aspects, any aspect of processes 700, 900, 1100, and/or 1300 may be alone or in combination with any other aspects of processes 700, 900, 1100, and/or 1300. In some aspects, any aspect of processes 800, 1000, 1200, and/or 1400 may be alone or in combination with any other aspects of processes 800, 1000, 1200, and/or 1400.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: determining a configuration from stored configuration information, wherein the configuration specifies a subset of features that a new radio (NR) UE with reduced capabilities is to support; and communicating according to the configuration.

Aspect 2: The method of Aspect 1, further comprising: transmitting a report to a base station based at least in part on a request from the base station, wherein the report includes one or more information elements that specify the subset of features; and receiving scheduling information compatible with the one or more information elements that specify the subset of features.

Aspect 3: The method of Aspect 1 or 2, wherein the configuration specifies that the UE is to support a same numerology for one or more of synchronization signals, a physical broadcast channel, or control resource set zero (CORESET0) during initial access to a serving cell.

Aspect 4: The method of any of Aspects 1-3, wherein the configuration specifies that the UE is to support up to a maximum quantity of different numerologies for one or more of mobility measurement, cell selection, or cell reselection.

Aspect 5: The method of any of Aspects 1-4, wherein the configuration specifies one or more of a waveform or a modulation coding scheme (MCS) that an NR UE with reduced capabilities is to support.

Aspect 6: The method of Aspect 5, wherein the configuration specifies that the UE is to support a low peak to average power ratio waveform on uplink for one or more of a physical uplink shared channel or a physical uplink control channel.

Aspect 7: The method of Aspect 5, wherein the configuration specifies that the UE is to support a 64 order quadrature amplitude modulation (QAM-64) MCS for downlink and a low spectral efficiency QAM-64 MCS for uplink.

Aspect 8: The method of Aspect 5, wherein the configuration specifies that the UE is to support a 64 order quadrature amplitude modulation (QAM-64) MCS for downlink and for uplink.

Aspect 9: The method of Aspect 5, wherein the configuration specifies that the UE is to support one or more of an MCS table or a channel quality indicator table associated with a relaxed modulation order for downlink and for uplink.

Aspect 10: The method of Aspect 5, wherein the configuration specifies that the UE is to support a subset of possible MCSs or channel quality indicators for downlink and for uplink.

Aspect 11: The method of Aspect 10, wherein a quantity of MCSs that the UE is to support for downlink is different than a quantity of MCSs or channel quality indicators that the UE is to support for uplink.

Aspect 12: The method of any of Aspects 1-11, wherein the configuration specifies a bandwidth, a quantity of transmission antennas, and a quantity of reception antennas that an NR UE with reduced capabilities is to support.

Aspect 13: The method of Aspect 12, wherein the configuration specifies that the UE is to support FR1 licensed spectrum, and support a maximum bandwidth of one of 20 MHz or 40 MHz.

Aspect 14: The method of Aspect 12, wherein the configuration specifies that the UE is to support a reduction of bandwidth capability.

Aspect 15: The method of Aspect 12, wherein the configuration specifies that the UE is to support a maximum of one transmission antenna and a maximum of one or two reception antennas.

Aspect 16: The method of any of Aspects 1-15, wherein the subset of features corresponds to a type of NR UE with reduced capabilities, and wherein communicating according to the configuration includes communicating according to the configuration based at least in part on a type of the UE.

Aspect 17: The method of Aspect 16, wherein the configuration specifies that the UE is to support a single design for synchronization signals and a physical broadcast channel for each of a plurality of types of NR UE that include different capability levels.

Aspect 18: The method of Aspect 16, wherein the configuration specifies that the UE is to support one or more of a plurality of different coverage recovery (CR) levels and one or more of a quantity of repetitions, a quantity of aggregation levels, a quantity of frequency hops, or a density of demodulation reference signal symbols corresponding to different CR levels supported by one or more types of NR UEs.

Aspect 19: The method of Aspect 16, wherein the configuration specifies that the UE is to support an adaptable bandwidth for control resource set zero (CORESET0) and a bandwidth part configuration, based at least in part on a target coverage recovery (CR) level.

Aspect 20: The method of Aspect 19, wherein the bandwidth part configuration for CORESET0 specifies that a target CR level is mapped to one of 24 resource blocks (RBs), 48 RBs, or 96 RBs.

Aspect 21: The method of Aspect 16, wherein the configuration specifies that the UE is to support an adaptable time domain repetition level for one or more of a synchronization signal burst, a group common physical downlink control channel, a multicast or broadcast physical downlink shared channel, a positioning reference signal, a channel state information reference signal, a physical random access channel, a physical uplink shared channel, or a physical uplink control channel based at least in part on a target coverage recovery level.

Aspect 22: The method of Aspect 16, wherein the configuration specifies that a type of NR UE with reduced capabilities is to support a same power saving mode, a same set of processing capabilities and timeline, or a set of fallback capabilities as another type of NR UE.

Aspect 23: The method of Aspect 16, further comprising transmitting an indication of one or more of a half-duplex operation type or a reduced radio resource management measurement in an information element.

Aspect 24: A method of wireless communication performed by a base station, comprising: determining a configuration for a user equipment (UE) from stored configuration information, wherein the configuration specifies a subset of features that a new radio (NR) UE with reduced capabilities is to support; and communicating with the UE according to the configuration.

Aspect 25: The method of Aspect 24, further comprising: receiving a report from the UE, wherein the report includes one or more information elements that specify the subset of features; and transmitting an indication of the configuration to the UE.

Aspect 26: The method of Aspect 24 or 25, wherein the configuration specifies that the UE is to support a same numerology for one or more of synchronization signals, a physical broadcast channel, or control resource set zero (CORESET0) during initial access to a serving cell.

Aspect 27: The method of any of Aspects 24-26, wherein the configuration specifies that the UE is to support up to a maximum quantity of different numerologies for one or more of mobility measurement, cell selection, or cell re-selection.

Aspect 28: The method of any of Aspects 24-27, wherein the configuration specifies that the UE is to support one or more of a modulation coding scheme table or a channel quality indicator table associated with a relaxed modulation order for downlink and for uplink.

Aspect 29: The method of any of Aspects 24-28, wherein the configuration specifies that the UE is to support one or more of a plurality of different coverage recovery (CR) levels and one or more of a quantity of repetitions, a quantity of aggregation levels, a quantity of frequency hops, or a density of demodulation reference signal symbols corresponding to different CR levels supported by one or more types of NR UEs.

Aspect 30: The method of any of Aspects 24-29, wherein the configuration specifies that a type of NR UE with reduced capabilities is to support a same power saving mode, a same set of processing capabilities and timeline, or a set of fallback capabilities as another type of NR UE.

Aspect 31: An apparatus for wireless communication at a device, comprising a processor; memory coupled with the processor; and instructions stored in the memory and executable by the processor to cause the apparatus to perform the method of one or more Aspects of Aspects 1-30.

Aspect 32: A device for wireless communication, comprising a memory and one or more processors coupled to the memory, the memory and the one or more processors configured to perform the method of one or more Aspects of Aspects 1-30.

Aspect 33: An apparatus for wireless communication, comprising at least one means for performing the method of one or more Aspects of Aspects 1-30.

Aspect 34: A non-transitory computer-readable medium storing code for wireless communication, the code comprising instructions executable by a processor to perform the method of one or more Aspects of Aspects 1-30.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 1-30.

As used herein, the term "component" is intended to be broadly construed as hardware, software, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, software, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a New Radio (NR) user equipment (UE) with reduced capabilities, comprising:
   determining a configuration from stored configuration information, wherein the configuration specifies a subset of features the NR UE is to support that includes:
      a maximum bandwidth of 20 megahertz (MHz) of a first frequency range (FR1) licensed spectrum,
      a maximum of one transmission antenna, and
      a maximum of one reception antenna or a maximum of two reception antennas;
   transmitting, based at least in part on determining the configuration and to a network node, a report including one or more information elements specifying the subset of features; and
   communicating with the network node according to the configuration.

2. The method of claim 1, further comprising:
   receiving, from the network node, a request for the report.

3. The method of claim 1, wherein the configuration specifies that the NR UE is to support a same numerology for one or more of synchronization signals, a physical broadcast channel, or control resource set zero (CORESET0) during initial access to a serving cell.

4. The method of claim 1, wherein the configuration specifies that the NR UE is to support up to a maximum quantity of different numerologies for one or more of mobility measurement, cell selection, or cell re-selection.

5. The method of claim 1, wherein the configuration specifies that the NR UE is to support one or more of a waveform or a modulation and coding scheme (MCS).

6. The method of claim 5, wherein the configuration specifies that the NR UE is to support a low peak to average power ratio waveform on uplink for one or more of a physical uplink shared channel or a physical uplink control channel.

7. The method of claim 5, wherein the configuration specifies that the NR UE is to support:
   one or more of a 64 order quadrature amplitude modulation (QAM-64) MCS for downlink, and
   a low spectral efficiency QAM-64 MCS for uplink, or a QAM-64 MCS for downlink and for uplink.

8. The method of claim 5, wherein the configuration specifies that the NR UE is to support one or more of an MCS table or a channel quality indicator table associated with a relaxed modulation order for downlink and for uplink.

9. The method of claim 5, wherein the configuration specifies that the NR UE is to support a subset of possible MCSs or channel quality indicators for downlink and for uplink.

10. The method of claim 9, wherein a quantity of MCSs that the NR UE is to support for downlink is different than a quantity of MCSs or channel quality indicators that the NR UE is to support for uplink.

11. The method of claim 1, wherein the configuration specifies that the NR UE is to support a reduction of bandwidth capability.

12. The method of claim 1, wherein the subset of features includes the maximum of two reception antennas.

13. The method of claim 1, wherein the subset of features corresponds to a type of NR UE with reduced capabilities, and wherein communicating according to the configuration includes communicating according to the configuration based at least in part on the type of NR UE.

14. The method of claim 13, wherein the configuration specifies that the NR UE is to support a single design for synchronization signals and a physical broadcast channel for each of a plurality of types of NR UEs that include different capability levels.

15. The method of claim 13, wherein the configuration specifies that the NR UE is to support;
   one or more of a plurality of different coverage recovery (CR) levels, and
   one or more of a quantity of repetitions, a quantity of aggregation levels, a quantity of frequency hops, or a density of demodulation reference signal symbols corresponding to different CR levels supported by one or more types of NR UEs.

16. The method of claim 13, wherein the configuration specifies that the NR UE is to support an adaptable bandwidth for control resource set zero (CORESET0) and a bandwidth part configuration, based at least in part on a target coverage recovery (CR) level.

17. The method of claim 16, wherein the bandwidth part configuration for CORESET0 specifies that a target CR level is mapped to one of 24 resource blocks (RBs), 48 RBs, or 96 RBs.

18. The method of claim 13, wherein the configuration specifies that the NR UE is to support an adaptable time domain repetition level for one or more of a synchronization signal burst, a group common physical downlink control channel, a multicast or broadcast physical downlink shared channel, a positioning reference signal, a channel state information reference signal, a physical random access channel, a physical uplink shared channel, or a physical uplink control channel based at least in part on a target coverage recovery level.

19. The method of claim 13, wherein the configuration specifies that the type of NR UE is to support a same power saving mode, a same set of processing capabilities and timeline, or a set of fallback capabilities as another type of NR UE.

20. The method of claim 1, wherein the one or more information elements includes an indication of a half-duplex operation type.

21. A method of wireless communication performed by a network node, comprising:
   receiving, from a New Radio (NR) user equipment (UE) with reduced capabilities, a report including one or more information elements specifying a subset of features of the NR UE that includes:
      a maximum bandwidth of 20 megahertz (MHz) of a first frequency (FR1) licensed spectrum,
      a maximum of one transmission antenna, and
      a maximum of one reception antenna or a maximum of two reception antennas;

determining a configuration for the NR UE that specifies the subset of features; and communicating with the NR UE according to the configuration.

22. The method of claim 21, further comprising:
transmitting an indication of the configuration to the NR UE.

23. The method of claim 21, wherein the configuration specifies that the NR UE is to support a same numerology for one or more of synchronization signals, a physical broadcast channel, or control resource set zero (CORESET0) during initial access to a serving cell.

24. The method of claim 21, wherein the configuration specifies that the NR UE is to support up to a maximum quantity of different numerologies for one or more of mobility measurement, cell selection, or cell re-selection.

25. The method of claim 21, wherein the configuration specifies that the NR UE is to support one or more of a modulation coding scheme table or a channel quality indicator table associated with a relaxed modulation order for downlink and for uplink.

26. The method of claim 21, wherein the configuration specifies that the NR UE is to support:
one or more of a plurality of different coverage recovery (CR) levels, and
one or more of a quantity of repetitions, a quantity of aggregation levels, a quantity of frequency hops, or a density of demodulation reference signal symbols corresponding to different CR levels supported by one or more types of NR UEs.

27. An apparatus for wireless communication, comprising:
one or more processors; and
one or more memories coupled to the one or more memories, the one or more memories storing instructions executable by the one or more processors to cause the apparatus to:
determine a configuration from stored configuration information, wherein the configuration specifies a subset of features a New Radio (NR) user equipment (UE) with reduced capabilities is to support that includes:
a maximum bandwidth of 20 megahertz (MHz) of a first frequency range (FR1) licensed spectrum,
a maximum of one transmission antenna, and
a maximum of one reception antenna or a maximum of two reception antennas;
transmit, based at least in part on determining the configuration and to a network node, a report including one or more information elements specifying the subset of features; and
communicate with the network node according to the configuration.

28. An apparatus for wireless communication, comprising:
one or more processors; and
or more memories coupled to the one or more processors, the one or more memories storing instructions executable by the one or more processors to cause the apparatus to:
receiving, from a New Radio (NR) user equipment (UE) with reduced capabilities, a report including one or more information elements specifying a subset of features of the NR UE that includes:
a maximum bandwidth of 20 megahertz (MHz) of a first frequency (FR1) licensed spectrum,
a maximum of one transmission antenna, and
a maximum of one reception antenna or a maximum of two reception antennas; and
determine a configuration for the NR UE that specifies the subset of features; and
communicate with the UE according to the configuration.

29. The method of claim 1, wherein the one or more information elements include an indication of a reduced radio resource management measurement.

30. The apparatus of claim 27, wherein the maximum of one or two reception antennas is a maximum of two reception antennas.

* * * * *